(12) United States Patent　　(10) Patent No.:　US 12,662,271 B2

Patrick et al.　　(45) Date of Patent:　Jun. 23, 2026

(54) APPARATUS, SYSTEM, AND METHOD FOR AUTOMATED FILLING OF SYRINGES

(71) Applicant: Culture Biosciences, Inc., South San Francisco, CA (US)

(72) Inventors: William Patrick, South San Francisco, CA (US); Collin Edington, South San Francisco, CA (US); Nicholas Lester, South San Francisco, CA (US); Brandon Apoo, South San Francisco, CA (US); Jessica Lee, South San Francisco, CA (US)

(73) Assignee: Culture Biosciences, Inc., South San Francisco, CA (US)

( * ) Notice: Subject to any disclaimer, the term of this patent is extended or adjusted under 35 U.S.C. 154(b) by 0 days.

(21) Appl. No.: 19/052,195

(22) Filed: Feb. 12, 2025

(65) Prior Publication Data

US 2025/0256871 A1　　Aug. 14, 2025

Related U.S. Application Data

(60) Provisional application No. 63/552,997, filed on Feb. 13, 2024.

(51) Int. Cl.
　　*B65B 3/08*　　　(2006.01)
　　*B65B 3/00*　　　(2006.01)
　　　　　(Continued)

(52) U.S. Cl.
　　CPC ............... *B65B 3/003* (2013.01); *B65B 3/08* (2013.01); *B65B 3/12* (2013.01); *B65B 7/2821* (2013.01); *G06K 19/06037* (2013.01)

(58) Field of Classification Search
　　CPC .. B65B 3/003; B65B 3/04; B65B 3/08; B65B 3/12; B65B 7/2821; G06K 19/06037
　　See application file for complete search history.

(56) References Cited

U.S. PATENT DOCUMENTS

| | | | | |
|---|---|---|---|---|
| 4,199,013 A | * | 4/1980 | Reich ................. | G01N 35/1011 |
| | | | | 141/136 |
| 7,478,513 B2 | * | 1/2009 | Baldwin ................... | B65B 9/02 |
| | | | | 53/426 |

(Continued)

FOREIGN PATENT DOCUMENTS

| | | |
|---|---|---|
| WO | 2022137061 A1 | 6/2022 |
| WO | 2023200679 A1 | 10/2023 |

OTHER PUBLICATIONS

International Search Report & Written Opinion mailed Apr. 4, 2025 for Application No. PCT/US2025/015814 a counterpart application of U.S. Appl. No. 19/052,195, 17 pgs.

(Continued)

*Primary Examiner* — Nicolas A Arnett

(74) *Attorney, Agent, or Firm* — Kevin D. Jablonski; FisherBroyles, LLP

(57)　　　　　ABSTRACT

Embodiments provide apparatus, systems and methods for automated filling of syringes. One embodiment of an apparatus for filing of a plurality of syringes (POS) comprises a housing, a push-pull mechanism (PPM) disposed within the housing, a syringe locking mechanism (SLM) coupled to the housing, a manifold engagement fixture (MEF) mounted on the housing, a processor and a touch screen (TS) positioned on the housing. The PPM engages the POS and independently advances or retracts a plunger of each syringe. The SLM engages and constrains the POS to substantially prevent syringe motion during filling. The MEF includes a cam mechanism having a lever means (e.g., a lever arm) and is configured to detachably engage halves of a multi-port fluid manifold and bring them together to form a fluidic seal by movement of the lever arm. The TS allows for haptic input and display of information associated with operation of the apparatus.

74 Claims, 17 Drawing Sheets

(51) Int. Cl.
    *B65B 3/12*           (2006.01)
    *B65B 7/28*           (2006.01)
    *G06K 19/06*        (2006.01)

(56)           References Cited

U.S. PATENT DOCUMENTS

| | | | | |
|---|---|---|---|---|
| 7,681,606 B2 * | 3/2010 | Khan | | B65B 3/003 |
| | | | | 141/147 |
| 8,286,671 B1 * | 10/2012 | Strangis | | B65B 7/28 |
| | | | | 141/144 |
| 11,234,900 B2 * | 2/2022 | Oda | | A61J 3/002 |
| 2004/0014177 A1 * | 1/2004 | Navran, Jr. | | C12M 29/04 |
| | | | | 435/325 |
| 2004/0016460 A1 * | 1/2004 | Newberg | | G01N 1/2035 |
| | | | | 137/551 |
| 2007/0161959 A1 * | 7/2007 | Spitz | | A61M 5/1782 |
| | | | | 604/187 |
| 2008/0035234 A1 * | 2/2008 | Khan | | B65B 3/003 |
| | | | | 700/231 |
| 2011/0003390 A1 * | 1/2011 | Kudla | | C12M 47/04 |
| | | | | 435/303.1 |
| 2012/0241042 A1 * | 9/2012 | Strangis | | B65B 7/28 |
| | | | | 141/2 |
| 2012/0253269 A1 * | 10/2012 | Patrick | | A61B 8/00 |
| | | | | 604/35 |
| 2013/0074581 A1 * | 3/2013 | Blacklin | | G01N 1/22 |
| | | | | 73/61.55 |
| 2015/0132840 A1 * | 5/2015 | Arnold | | C12M 23/42 |
| | | | | 156/60 |
| 2018/0105294 A1 * | 4/2018 | Abboud | | B65B 3/003 |
| 2018/0362909 A1 * | 12/2018 | Watkins | | C12M 23/46 |
| 2021/0379279 A1 * | 12/2021 | Endyk | | A61M 5/1782 |
| 2021/0403853 A1 * | 12/2021 | Ludlam | | C12M 23/20 |
| 2022/0002652 A1 * | 1/2022 | Patrick | | B01F 33/86 |
| 2023/0036574 A1 * | 2/2023 | Stroup | | B65B 3/14 |

OTHER PUBLICATIONS

International Search Report & Written Opinion mailed May 29, 2025 for Application No. PCT/US2025/014134 a counterpart application of U.S. Appl. No. 19/041,898, 23 pgs.

Invitation to Pay Additional Fees mailed Apr. 3, 2025 for Application No. PCT/US2025/014134, a counterpart application of U.S. Appl. No. 19/041,898, 3 pgs.

Metze, et al., "Monitoring Online Biomass With a Capacitance Sensor During Scale-Up of Industrially Relevant CHO Cell Culture Fed-Batch Processes in a Single-Use Bioreactors," Bioprocess Biosys. Eng., vol. 43, 2020, pp. 193-205.

* cited by examiner

APPARATUS, SYSTEM, AND METHOD FOR AUTOMATED FILLING OF SYRINGES

CROSS-REFERENCE TO RELATED APPLICATIONS

This application claims the benefit of and priority to U.S. Provisional Patent Application Ser. No. 63/552,997, filed on Feb. 13, 2024, and titled "Apparatus, System, And Method For Automated Filling Of Syringes" the contents of which are incorporated herein for all purposes.

FIELD

Embodiments described herein relate to apparatus, systems and methods for filling of syringes with liquids. More specifically, embodiments relate to apparatus, systems and/or methods for the automated filling of multiple syringes with different liquids. Still more specifically, embodiments relate to apparatus, system and methods for the automated filling of multiple syringes incorporated into a single structure.

BACKGROUND

There are a number of applications in fluid delivery technology where both sterile delivery and high accuracy and precision are required most notably, for the delivery and/or preparation of sterile injectable medications and also for the delivery and/or preparation of sterile solutions used in a bioreactor for the growth of cells (e.g., cells engineered to produce biopharmaceuticals or other biologic compounds) and various cell growth related experiments. There are two commonly utilized methods in such situations. The first method is peristaltic pumping, which allows a mechanical pump head to interface with a sterile fluid system by deforming a soft rubber tube and squeezing the fluid forward by peristalsis, as the name suggests. This method has the advantage of making it easy to connect a non-sterile system (the mechanical part of the pump) with a sterile system (the fluid-containing components). The downside of this system is that it's open-loop and often prone to errors in volumetric delivery as fluid "slips" past the pump mechanism and delivers more or less than predicted. Attempts have been made to address this drawback using feedback from flow sensors and scales to measure the total delivery can also be prone to errors and so precision is often lacking in systems utilizing peristaltic pumps.

The second method used in fluid applications requiring accuracy and sterility involves syringe pumps where a mechanism (the syringe pump) engages a syringe. Displacement of the syringe plunger by the mechanism forces fluid through tubing. Syringe pumps are extremely accurate in flow rate and volumetric delivery and are the fluid delivery method of choice for even microfluidic applications where nanoliters per minute are required.

However, the process of filling the syringes has a number of technical issues affecting both the accuracy and precision of the filled volume of liquid in the syringe. For example, due to the physical manufacturing imperfections of the syringe barrel as well as the friction of the plunger's seal, significant variations in back pressure can result during the filling process (e.g., by withdrawal of the syringe barrel manually or by the syringe pump). These variations can in turn vary or otherwise affect the total volume of liquid transferred to the syringe. Also, when syringe filling is done on a purely manual basis by withdrawal of the syringe barrel, further inaccuracies can result due to visual marking on the syringe barrel being inaccurate or otherwise hard to read.

Thus, there is a need for improved methods for the filling of syringes, in particular, for applications requiring high accuracy and precision in the filling process such as those in the cell culture, biological research and medical fields.

BRIEF DESCRIPTION OF THE DRAWINGS

Embodiments of the subject matter disclosed herein in accordance with the present disclosure will be described with reference to the drawings, in which.

Note that the same numbers are used throughout the disclosure and figures to reference like components and features.

DETAILED DESCRIPTION

Figure 1:
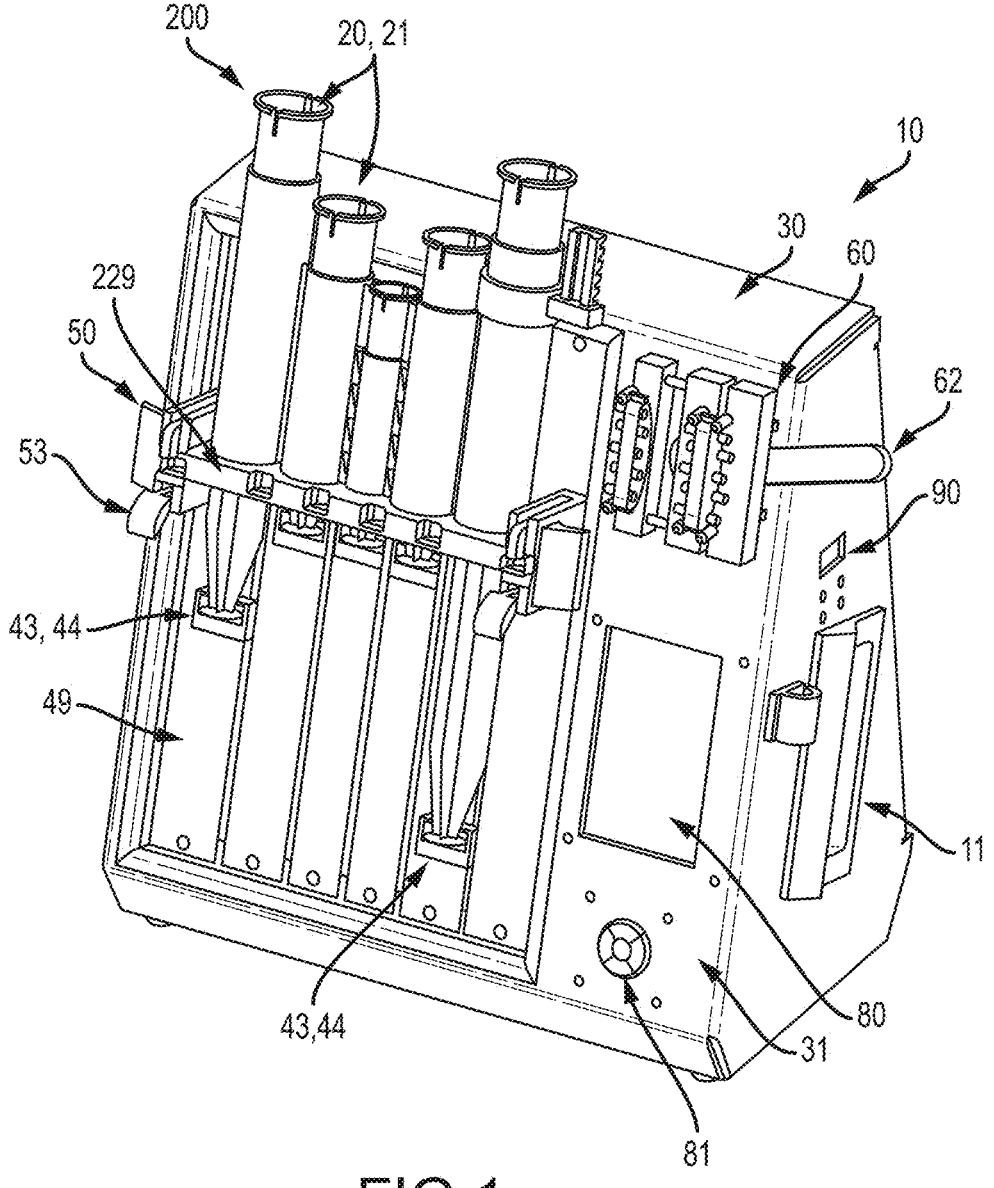
FIG. 1 is an isometric view of an embodiment of an automated syringe filling apparatus illustrating various components of the apparatus including the housing, push-pull mechanism, the syringe locking mechanism, manifold engagement fixture and touch screen.
Figure 2:
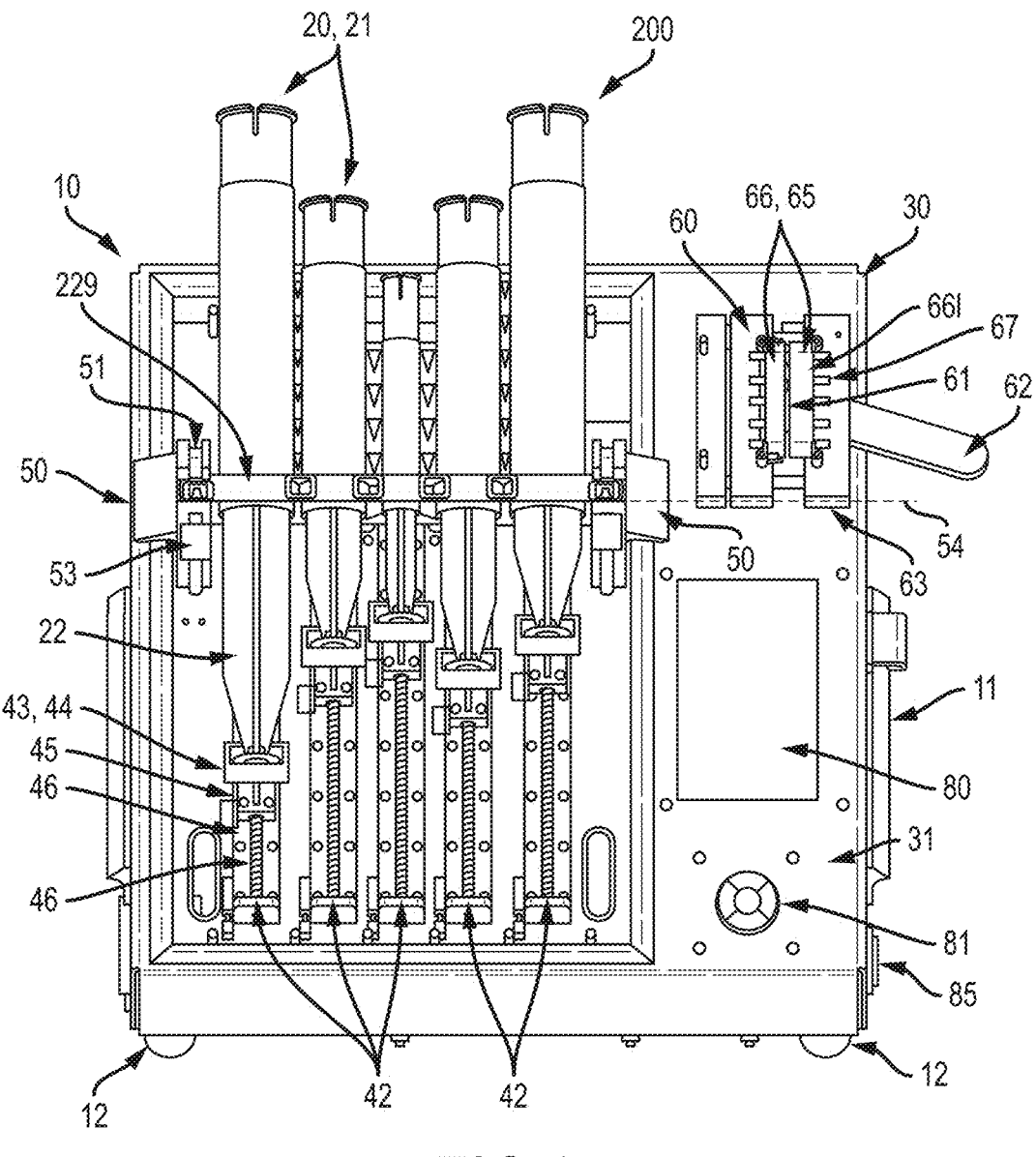
FIG. 2 is a front cut away view of an embodiment of an automated syringe filling apparatus illustrating the push-pull block mechanism and the positioning and engagement of syringes in the syringe block by the mechanism.
Figure 3A:
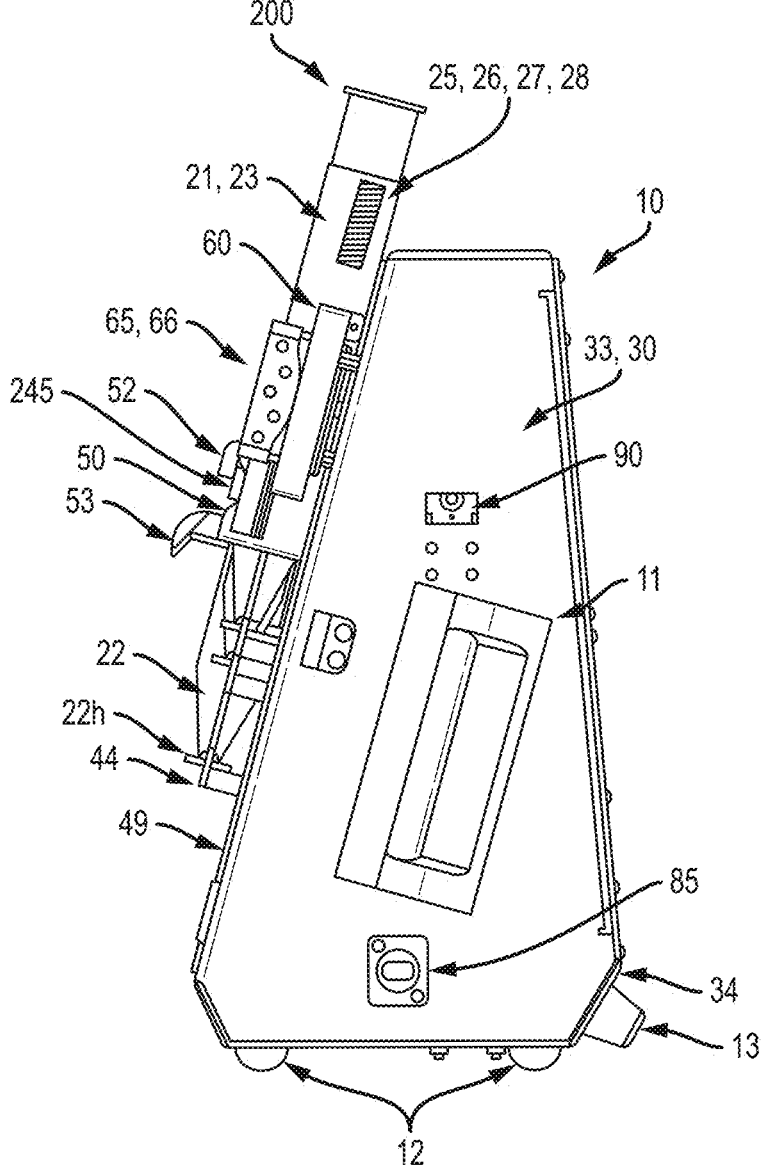
FIG. 3A is a side view of an embodiment of an automated syringe filling apparatus.
Figure 3B:
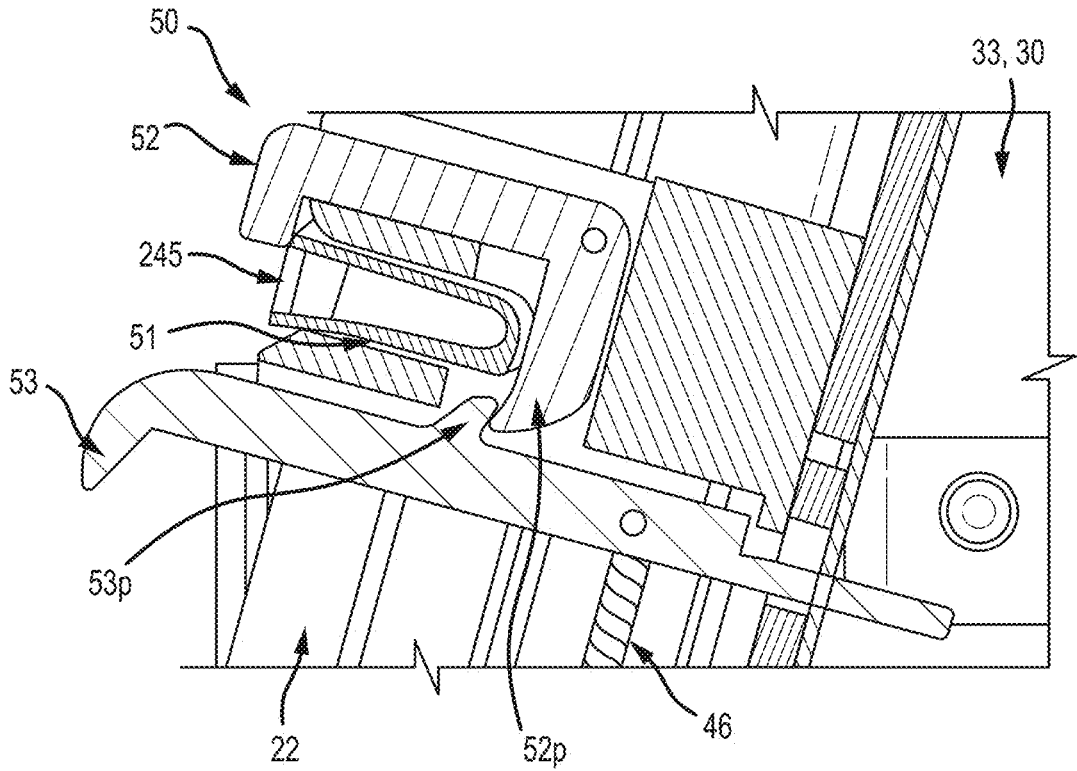
FIG. 3B is a cross-sectional side view of an expanded portion of the automated syringe filling apparatus illustrating the locking in place of an embodiment of a syringe pack in the syringe locking mechanism.
Figure 4A:
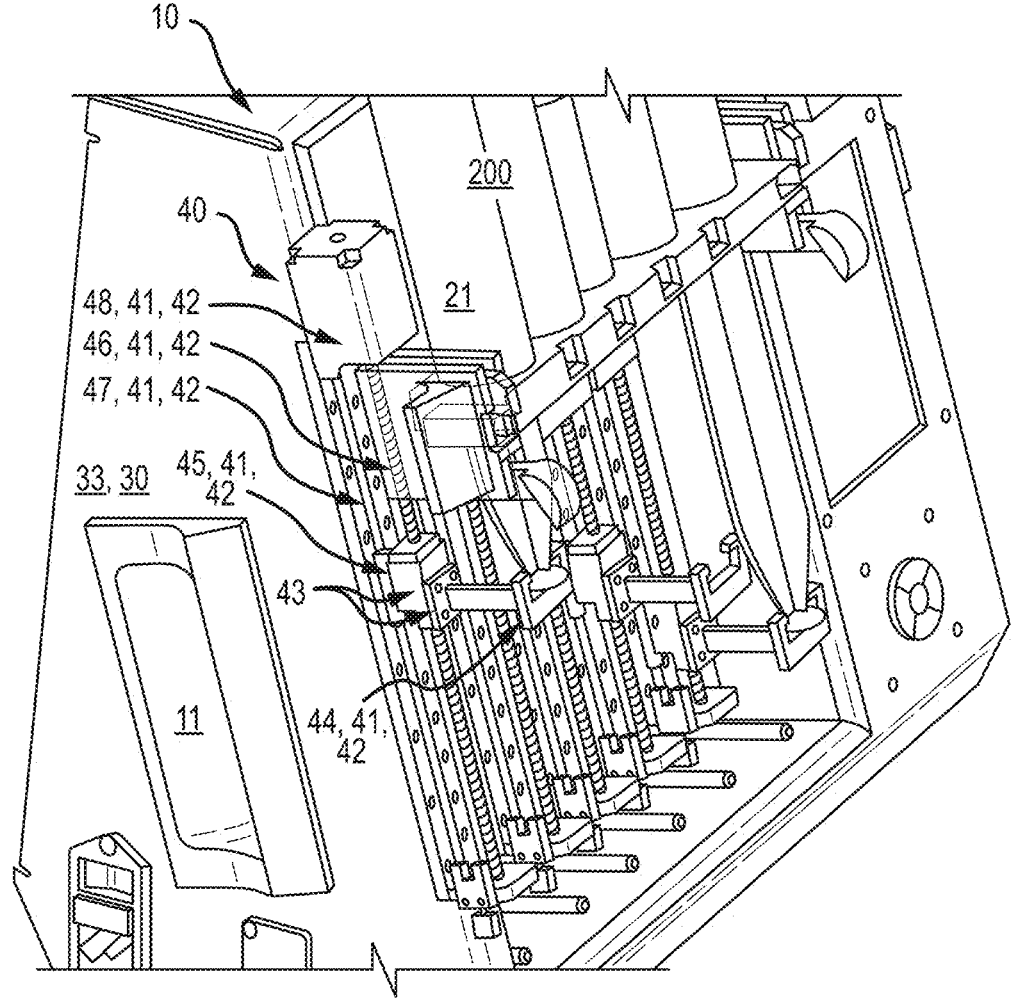
FIG. 4A is an isometric view illustrating components of the push-pull mechanism including the push-pull block assembly, screw, rail and motor.
Figure 4B:
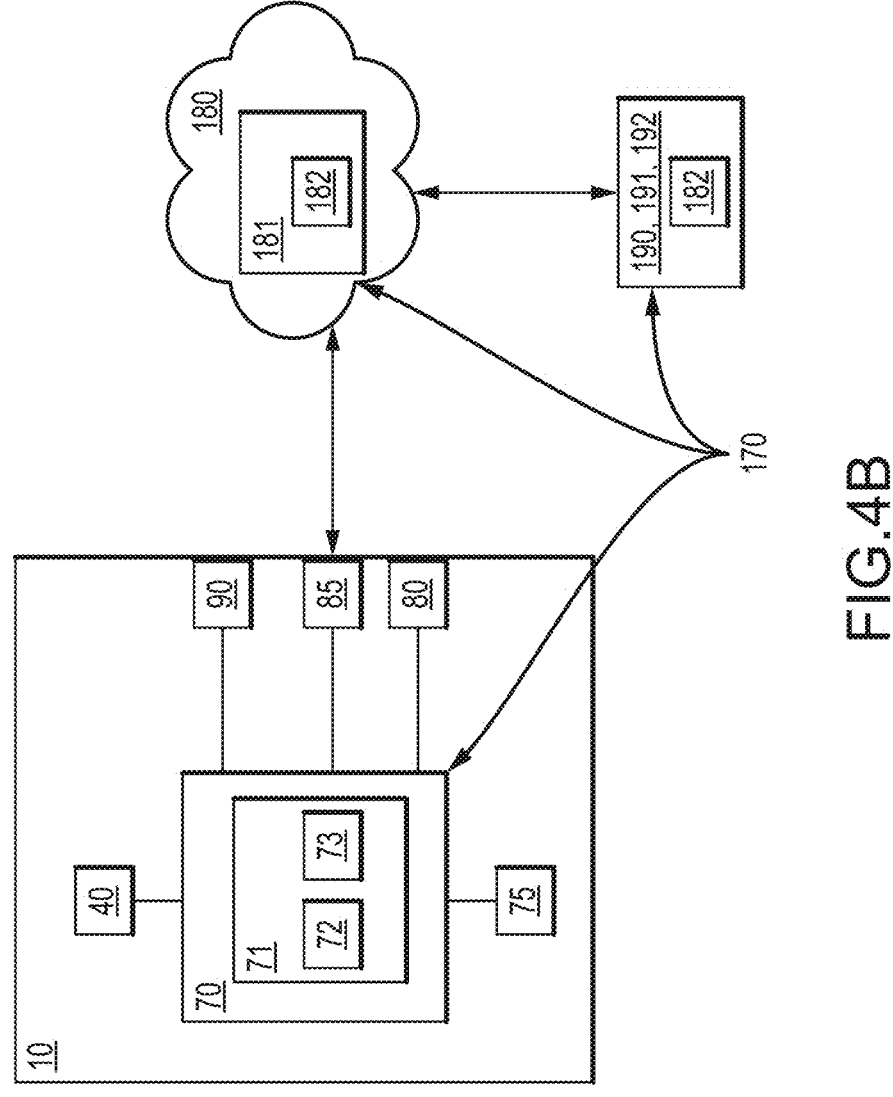
FIG. 4B is a block diagram illustrating embodiments of a computer and/or cloud-based system for controlling one or more operations of the automated syringe filling apparatus.
Figure 5:
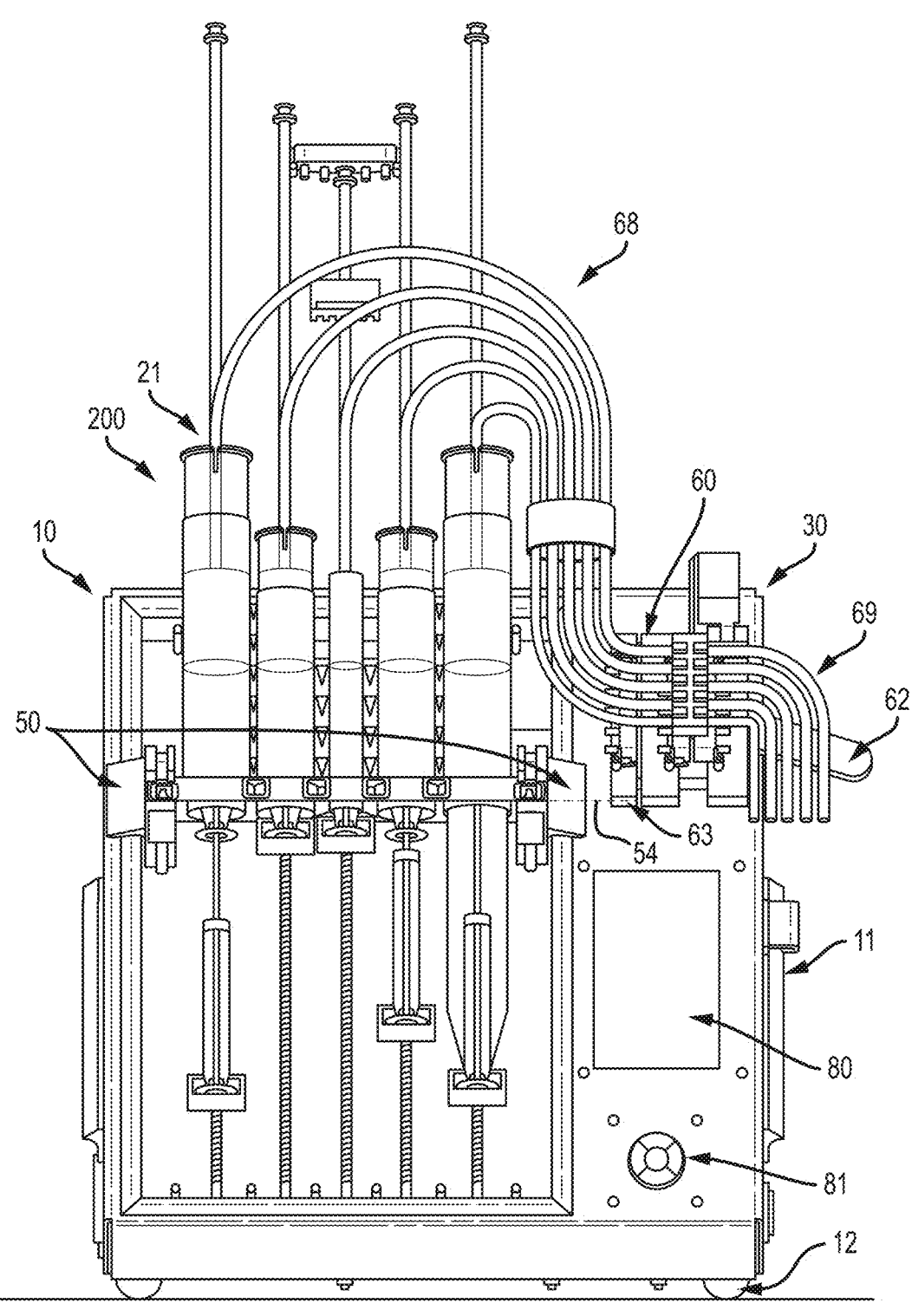
FIG. 5 is a front view of an embodiment of the automated syringe filling apparatus illustrating tubing connections between the manifold engagement fixture and connecting apertures of syringes positioned in the push-pull mechanism.

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

By way of an overview, embodiments of the invention provide Embodiments provide apparatus, systems and methods for the filling of multiple syringes with one or more liquid solutions such as a nutrient or other solutions used for cell culture growth within a bioreactor. Many embodiments provide apparatus, systems and methods for the automated filling of multiple syringes where the syringes are integrated into a single structure sometimes referred to herein as a syringe pack. In these and related embodiments, the apparatus described herein is sometimes referred to as an auto-filler apparatus or sometimes just as an auto-filler. Related embodiments also provide a syringe pack which can be configured for use in one or more embodiments of the auto-filler.

In a first aspect, embodiments provide an apparatus and system for the automated filling of multiple syringes (also referred to herein as a plurality of syringes) from source containers of selected fluids. The number of syringes in the plurality can range from two to five with larger numbers also contemplated. In many embodiments, the plurality of syringes is integrated into or otherwise contained in a single structure such as a syringe pack described herein. Though In alternative embodiments, the plurality of syringes can be contained in two or more structures. The apparatus comprises the physical device that performs the filling and the system comprises the apparatus loaded with one or more syringes to be filled. The system may also include external databases or logic resources such as a cloud-based database or a remote computer system operatively coupled to the apparatus. One embodiment of such an apparatus, (herein referred to as an auto-filler) comprises a housing, a push-pull mechanism, a syringe locking mechanism, a manifold engagement fixture, a processor or other controller, a touch screen or other user interface and an optical scanner. The push pull mechanism is typically positioned at least partially within the housing and is configured to engage the plurality of syringes and independently advance or retract a plunger of each syringe of the plurality. In particular embodiments, the push-pull mechanism comprises separate sets of push-pull block assemblies, drive screws, rails and motors with one set for each syringe to be loaded into the mechanism. Each set of components make up a push-pull mechanism subunit, with each subunit independently operable from the others. Typically, each subunit has an exterior portion (the syringe engagement component described below) positioned outside of the housing for engaging the syringe and an interior portion covered by a faceplate.

The push-pull block assembly comprises a syringe engagement component attached to a block component. The syringe engagement component is configured to fit over and engage a syringe plunger to advance or withdraw the plunger. The block is driven by a drive screw which runs through a threaded opening in the block component. The bottom portion of the block component also rides over a guide rail (by means of a slot in the bottom portion of the block component) to guide and stabilize the motion of push-pull block assembly as it moves up and down so that the motion of the push-pull block assembly is linear. The motor is mechanically coupled to the drive screw to turn screw. Preferably, the motor corresponds to a stepper motor configured to provide controlled precise movement of the push-pull blocks and thus high precision in filling of the syringes; however other dc motors known in the electrical arts are also contemplated.

In many embodiments, the push-pull mechanism is configured to simultaneously fill all syringes positioned in the mechanism (either when positioned individually or in the form of a syringe block). Such simultaneous filling allows for rapid filling of all the consumable solutions used for a given bioreactor or other biological run or experiment, saving time by not having to sequentially fill syringes. Simultaneous filling capability will typically be achieved through the separate push-pull mechanism subunits described herein and/or through the use of separate dedicated stepper or other motor for each syringe block. However, in alternative embodiments, simultaneous filling can be implemented through gearing allowing for varying amounts of movement of different syringe blocks even when driven by a single motor.

In various embodiments, the push-pull mechanism (sometimes referred to herein as just "mechanism") can also be configured to have various characteristics to improve the accuracy and precision and other aspects of the syringe filling process. For example, in many embodiments, the mechanism is configured to have a well characterized amount of backlash which can cause inaccuracy or variations in fill volumes. A brief explanation will now be provided on backlash. This is a phenomenon caused by inertial deformation or other inertial movement in components of the auto-filler system (e.g., the push-pull block assembly or components of the syringe plungers like the silicone plunger seals) when the push-pull block changes direction for example from advancement to withdrawal. The inertial deformation or movement of one or more of the above components can cause under or over delivery of fluid to a given syringe. Thus, having a well characterized amount of backlash allows for compensatory motions of the syringe plunger to correct for filling inaccuracy caused by the backlash.

Also in many embodiments, the mechanism is configured to accommodate syringes of different sizes, for example 50 cc, 100 cc, 200 cc, either singly or when supplied in the form of a single syringe pack. In the latter case, the syringes will typically be oriented in the same geometry within the syringe pack e.g., all in the same direction.

Further, the mechanism can be configured to fill syringes (from source containers of selected fluids) over a range of flow rates e.g., 10, 20. 50, 100, 150 or 200 ml/min or even faster with high accuracy and precision (e.g., accuracy of 95% or greater and precision, as measured by coefficient of variation, of 5% or less). Higher flow rates allow for rapid filling of all syringes and in turn reduced preparation time. Accuracy and precision at higher flow rates are obtained by minimizing and/or compensating for backlash and associated hysteresis in movement of one or more components of the mechanism. Further, in specific embodiments, the situation of any backlash or hysteresis in the filling of one syringe affecting filling of another syringe can be minimized through the use of separate and independently operable push-pull mechanism subunits. In these and related embodiments, the subunits are configured to minimize the transference of any motion from filling a particular syringe to an adjacent or other subunit.

The syringe locking mechanism also referred to as a syringe nest, is mounted or otherwise coupled to the housing surface and/or auto-filler housing and is configured to engage and constrain all syringes in the plurality in at least three degrees of freedom so as to substantially prevent motion of all syringes in the plurality during the process of filling of one or more syringes in the plurality by the push-pull mechanism. In various embodiments, the at least three degrees of freedom can comprise translation degrees of freedom in at least of the one of the x, y and z directions corresponding to forward and back motion, side to side motion (i.e., left and right) and up and down motion of the syringes (i.e. motion, vertical) and rotational degrees of freedom in at least on the x, y and directions corresponding to pitch, yaw and roll motion as is known in the aeronautical arts. In particular embodiments the syringe nest is configured to constrain the syringes the plurality in six degrees of freedom including three degrees of translation freedom in the x, y and z directions and three degrees of rotational freedom in the x, y and z directions so as to prevent or minimize forward and back motion, side to side motion, up and down motion and pitch, yawl and roll motion of the plurality of syringes during filling of at least one syringes in the plurality. Note that these constraints do not apply to movement of the syringe barrel(s) of a given syringe(s) that are in the process of being filled. In embodiments where the plurality of syringes (e.g., two to five syringes or more) are contained in a syringe pack, the syringe nest can be configured to engage a lock feature or element on the syringe pack so as to secure the syringe pack in place on/in the syringe nest. In use, embodiments of the syringe nest configured to constrain the syringes in the least three degrees of freedom described above serve to improve the accuracy and precision of the volume of fluid added to each syringe during the filling process in particular during faster rates of filling for example at a filling rate of about 200 ml per minute or higher.

The manifold engagement fixture is mounted to or otherwise coupled to the housing and includes a cam mechanism having a lever arm or other lever means. The engagement fixture is configured to detachably engage two mating halves of a multi-port fluid manifold and bring them together to form a fluidic seal between the two halves by movement of the lever arm or other lever means. Movement of the lever arm or other lever means (in an opposite direction used to join the mating halves of the multiport fluid manifold) is also used to separate the two halves when filling of the syringes is complete. Use of the lever arm or other lever means provides the benefit of reducing the risk of contamination of the manifold since the user's hands are kept clear of either half of the manifold to make or break the connection between the two halves. The lever arm or other lever means also provides a mechanical advantage to reduce the force required to join and separate the mating fluid connectors, thereby reducing user fatigue as well.

The multi-port fluid manifold (sometimes referred to herein as just "manifold") serves to make and break a fluid connection between each syringe and a bottle of source fluid (e.g. culture media). Specifically, the manifold serves to fluidically connect a piece of tubing coming from each syringe (typically connected to a syringe aperture) to another piece of tubing submerged in the source fluid. In various embodiments, the manifold enables multiple connections to be made instantaneously and sterilely, using the lever operated cam mechanism on the manifold engagement fixture that brings the two halves of the manifold together and apart. This cam mechanism reduces the chance for user error when making the connections between source bottles of liquid and syringes, as the two halves of the manifold are asymmetric and can only be connected in one arrangement. Also in many embodiments, the manifold halves can include labeling (e.g., lettering or numbering) that correspond to similar labeling on the syringe pack, further reducing the risk of connection errors.

In many embodiments, one or more of the push-pull mechanism, syringe locking mechanism (or syringe nest), manifold engagement fixture and touch screen are at least partially positioned on a front face of the auto-filler housing. In particular embodiments, all of them are positioned on the front face of the housing. Also in various embodiments, the aforementioned items can be arranged and positioned with respect to one another so that the positioning and/or use of one item does not physically or visually block another item or otherwise impair its function. For example, the manifold engagement fixture is desirably positioned sufficiently above the touch screen so that the fixture or tubing connections to the fixture do not physically or visually block the touch screen or obstruct or impede its use as well as that of the navigation button. Also, the syringe nest and manifold engagement fixture are desirably arranged and positioned on an upper portion of the housing front face so that tubing lengths connection ports on the that tubing lengths connecting ports on the multi-port manifold to connecting apertures on the plurality of syringes are minimized. In particular embodiments, this can be achieved by positioning the vertical center line of the syringe nest within a selected distance of the vertical centerline of the manifold engagement fixture. In various embodiments, this distance can be in a range of about 0.1 to about 2 inches.

Also in various embodiments, the front face of the housing can be titled backwards at an acute relative to a vertical axis of the apparatus. In particular embodiments, this angle is selected to provide for optimal ergonomic operation of the auto-filler by a user when top or greater portion of the housing is positioned behind the window sash of a biosafety hood (or other biosafety enclosure) and the user has to put their hands and arms up and around the sash to operate the auto-filler including positioning of the syringe pack in and out of the auto-filler and making various tubing connections to the syringe pack.

The processor or other controller is disposed within the housing and is operatively coupled to at least the push-pull mechanism to control one or more functions or operations of the auto filler including motion of the push-pull mechanism. The processor typically corresponds to a microprocessor or other logic resources and includes one or more software modules or other electronic instruction sets operable on the processor for controlling one or more functions or operations of the auto-filler including operation of the push-pull mechanism for filling the syringes positioned in the mechanism. Collectively, the processor and the software modules contained or operatively linked to the processor make up a computer system.

In particular embodiments the software modules are configured to control motion of individual push-pull block assemblies and thus the motion of individual syringe plungers for filling a selected syringe. Also in many embodiments, the processor can be configured to interface with a cloud-hosted or local server hosted database (e.g. via the internet) that contains filling instructions previously determined by the user through a web browser-based portal or other user interface. The filling instructions are incorporated into a software module or other electronic instruction set that can be operatively linked to the processor through the cloud and/or network connection (which can include a local network connection). The portal enables the filling instructions to be generated in a semi-automated manner, checked against the planned delivery for a particular bioreactor run, experiment, and the like, and repeated n times without extra data entry burden on the user. Embodiments where the processor interfaces with a cloud-based or other remote database of filling instructions (which are encoded in a software module) are sometimes referred to herein as a cloud-based computer system. In these and related embodiments, the auto-filler can include memory resources integral to or otherwise operatively coupled to the processor for storing software containing the filling instructions or other instructions for operation of the push-pull mechanism or other aspect of the auto-filler.

In addition to controlling location of the syringe plungers, embodiments of the software modules (contained in the apparatus or operatively linked to it, e.g., via the cloud or a remote network) can also be configured to perform one or more complex physical movements of the plungers incorporating push and pull actions to do one or more of the following: (1) purge air from the syringes that may have been introduced during the filling process, (2) account for backlash in the mechanical system, (3) ensure maximal precision of the amount filled by ending syringe motion on a "push" to eliminate hysteresis effects of the rubber plunger, and (4) include extra volume in the fill to account for the empty tubing leading into bioreactor or other vessel which will receive the syringe.

There are a number of benefits to performing the above functions. For example, purging air helps ensure the syringe is completely filled with fluid. In addition to reducing total volume error, this can help limit oxidation of air-sensitive components in the in culture media or other solution contained in the syringes and reduce evaporation that can lead to crystallization of high concentration components in the solutions such as glucose.

Ending the syringe filling process on a "push" improves fill volume accuracy by eliminating any perceived fluid delivery caused by backlash, as described above, and also eliminating the time-variant hysteresis of flexible components. These components may cause the fluid to begin flowing slightly after the pushing force is applied to the plunger and continue slightly longer after the plunger has stopped. Since this hysteresis can be characterized for each size of syringe, it can be built into the filling process and accounted for, something that would be impossible for a human operator to do by hand.

Extra fluid volume can be included automatically to account for the priming of empty tubing in the bioreactor vessel. This ensures that the volume available to be delivered into the reaction is the exact amount the user specified. If the filling volume is simply "10 mL" for example, the syringe may only be able to deliver "9.5 mL" to the bioreactor, as the "dead volume" remaining between the top of the syringe and the cell culture fluid may be 0.5 mL in this example. This is not something that manual operators would be able to easily account for, but further increases the accuracy of total volume delivery, which is critical in applications where an amount delivered is equally important to the rate at which it was delivered.

In addition to the above motions, various embodiments of the auto-filler and resident or operationally linked software modules, may also be configured for various fluidic mixing applications including, for example, mixing of solutions such as transfection agent solutions and plasmid solutions to produce a transfection solution used for cell culture processes involving viral transfection of mammalian or other cells. In these and related embodiments, the auto-filler and software modules can be configured to pump and/or circulate transfection agent and plasmid solution back and forth between two or more syringes containing the solutions a selected number of cycles and at selected flow rates. In various embodiments, the final mixed solution may filled (pumped) into one or more of the syringes containing the precursor solutions (e.g., the transfection agent solution or the plasmid solution) or it may be directed (e.g., under software control) into a receptacle syringe. In alternate or additional embodiments, the act of mixing involves circulating the mixing solution between the syringes containing the precursor solutions and the receptacle syringe.

The touch screen or other user interface is desirably positioned on the front face of the housing and is operably coupled to the processor to send and receive signals to and from the processor. The touch screen is configured for haptic input and display of information associated with operation of the apparatus, for example, fill volumes for each syringe in the plurality. It is also configured to send signals to the processor encoding the haptic input by a user and receive signals from the processor encoding information to be displayed on the screen. In many embodiments, the housing front face includes a navigation button operatively coupled to the touch screen to allow a user to navigate to different locations on the touch screen with a gloved or wet finger. Preferably, the navigation button is positioned below the touch screen on the housing front face so that the user can operate the button without blocking their view of the touch screen.

The optical scanner is configured to optically scan indicia on one or more of the syringes and/or the syringe pack, encoding information on syringe contents (e.g., type and volume of solution) and send signals encoding the information contained in the optical indicia to the processor. The scanner may correspond to a barcode scanner preferably a 2D scanner and in these and these embodiments, the indicia may correspond to one or more of a barcode, QR code or data matrix. However other optical scanners and indicia known in the art are also contemplated. In particular embodiments, the bar or QR code may encode a website address containing information on the solution type and volume with which a given syringe(s) is to be filled.

The scanner may be embedded or otherwise coupled to various locations on the housing surface, but preferably is positioned on a side surface of the housing allowing a user to quickly scan indicia on the syringes and/or a syringe pack without physical or optical interference by components on the front surface of the housing and/or impeding the view of the front surface of the housing.

Through the use of the barcode or other optical scanner, consumables used in a bioreactor experiment or run (or other biological run or experiment or IV infusion) can be linked in a database to the intended experiment or run. Once linked to a run, the instructions for the consumables (e.g., the volume, reagent types, and concentrations to be used) can be pulled up for the operator as a reminder. This also completes the traceability cycle, tying together experiment, run, reagents, amount dispensed, and bioreactor vessel, along with consumable information like manufacturing date, sensor calibration data, physical configuration (e.g., syringe capacity, reactor impeller configurations, and the like). By linking all these disparate components together to the fill instructions at the time of syringe filling, the operator gains a high-fidelity record of the experiment to help troubleshoot issues later on and keep a precise history of the parameters and variables that were tested. All of this is done with minimal data entry from the user, and therefore minimizes the risk of mistakes. In related implementations, use of the bar code or other optical scanner also allows the user to be alerted of potential operator mistakes before they occur. For example in certain embodiments, the bar code/optical scanner can be used to link a particular syringe to a target reactor hardware so that upon mating of the syringe to the hardware, if the link is not verified as affirmative, the user is warned that the syringe is not intended for this reactor.

Embodiments of the auto-filler apparatus and system described herein are desirably configured to aseptically fill the syringes in the syringe pack with culture media or other selected solution. This objective can be accomplished by several means. First, through the selection of chemically resistant plastic or metal material for the auto-filler housing which can be wiped down or sprayed with disinfectant solution without appreciable degradation of the housing so that the auto-filler can be brought into a sterile field such as that in biosafety hood without compromising the sterile field. Second, by the configuration of the size, shape, footprint and other attributes of the auto-filler so that it can be easily brought into and operated within the confines of a sterile enclosure such as that of a biosafety hood or other biosafety cabinet. This can be further facilitated by the incorporation of handles on either side of the auto-filler allowing the user to easily carry and place the auto-filler in the biosafety hood.

In particular embodiments, aseptic filling of the syringes can also be facilitated by configuring the front face of the housing to tilt backwards at an acute angle (e.g., about 4 or 15 degrees) relative to a vertical axis of the apparatus allowing the user to ergonomically operate the auto-filler when a portion of the auto-filler is placed behind the window sash of a biosafety cabinet. This will reduce the need of the user to have to push up the window sash to operate the auto-filler including placement and removal of the syringe pack. Other configurations of the auto-filler (including different vertical orientations) for its ergonomic operation in the biosafety cabinet are also contemplated.

In use, embodiments of the apparatus, systems and methods for automated filling of syringes described herein provide a number of benefits. For example, embodiments of the auto-filler apparatus and systems described herein allow for the filling of multiple syringes in predetermined volumes in a high-throughput and extremely precise manner. Use of the multi-port fluid manifold (providing up to a five-way connection with larger numbers also contemplated) along with manifold engagement fixture significantly reduces the manual labor required to fill multiple syringe packs. The manifold engagement fixture also ensures a strong and consistent fluid seal between halves of the port and hands-off separation in making the connection to reduce the chances of leaks and contamination. Also, embodiments of the auto-filler having an angled front face of the housing allow for ergonomic operation by a user when portions of the auto-filler are positioned behind a window-sash or other shield of a biosafety cabinet or hood. Embodiments of the computer system that are incorporated into or otherwise operatively linked to the auto-filler apparatus provide assistance to the user in preventing human-error from filling and data entry, and also gives a traceable record of the filling process that was performed, unlike manual filling methods such as pipetting. This helps remove some of the barriers to using syringe pumps, making their superior accuracy more accessible to lab operations. Further as described above, use of the optical scanner and optical indicia on the syringe provides high fidelity records and traceability of the consumables used in a bioreactor or other biological run or experiment. Similar benefits in traceability and high-fidelity records can be obtained for use of the auto-filler to fill syringes with solutions for IV or other infusion into a patient and/or for the preparation of IV or other medicinal solutions. Still other benefits of embodiments of the auto-filler having one or more features described herein are contemplated and/or will be apparent to those skilled in the art. For example, embodiments of the auto-filler having the nest described herein also provide for a keyed syringe structure that cannot be installed in any way in the auto-filler other than the correct orientation, thus eliminating the possibility of pumping the wrong fluid into a selected bioreactor vessel(s) or other fluid container for a given experimental run. Further, by utilizing such keyed syringe configurations, setup errors in the auto-filler are effectively reduced or minimized. In another aspect, embodiments of the invention provide a syringe-pack or other multi-syringe structure comprising multiple syringes having an integral structure which is configured to engage with and have its syringes filled by one or more embodiments of the auto-filler described herein. The syringe pack is also configured to engage with a multi-unit syringe pump or like fluid delivery apparatus to controllably dispense the liquid contents of each syringe to a bioreactor reactor vessel or other selected vessel or fluid container and in alternative embodiments, to a patient. One embodiment of such a multi-syringe structure configured for use at least one of a fluid delivery apparatus or a filling a plurality of syringes, a plurality of connecting struts and a rigid support flange. Each syringe in the plurality includes a syringe body or barrel and a plunger having a plunger head at an exterior end of the plunger. Each connecting strut of the plurality is fixedly positioned between the bodies of two syringes. The rigid support flange is fixedly coupled to a bottom portion of each syringe body and together with the connecting struts is configured (e.g., by means of structural rigidity) to minimize movement of the syringes with respect to each other. The support flange also includes locking features positioned at opposite horizontal ends of the flange. The locking features are configured to detachably engage a locking mechanism of the fluid delivery apparatus and when so engaged, the locking features together with the support flange are configured to fix each syringe of the plurality in place in three axes so that each syringe head of the plurality of syringes can be independently engaged by separate elements of the fluid delivery apparatus.

In many embodiments, each syringe in the syringe pack includes a letter or number (e.g., A, B, C; 1, 2 3, and the like) or other identifying symbol or marking (e.g., color) which corresponds to the same letter, number, color and the like, on a half of the multiport manifold which is connected or intended to be connected to the syringe pack via tubing connections as is described herein. This allows a user to quickly check that the right connection is made between each syringe and a bottle or other container of source fluid used to fill each syringe reducing the likelihood of errors.

Also in many embodiments, the syringe pack or other multi-syringe structure includes scannable indicia encoding content information of at least one syringe of the plurality. The content information is used by the filling or fluid delivery apparatus to control the filling or delivery of fluid within at least one syringe of the plurality. In various embodiments, the syringes may be fabricated from various biocompatible polymers known in the syringe arts including for example polyethylene, polypropylene, cyclo-olefin copolymer or cyclo-olefin polymer. In some embodiments, at least two of the syringes in the plurality have different sizes including different lengths or diameters.

In some embodiments, the structure can include a handle coupled to the support flange which allows the structure to be carried by the user without touching the syringes in the structure. The handle can also be configured to allow a user to apply a distributed force to the support flange and locking features for engaging the locking feature with the locking mechanism of the filling or fluid delivery apparatus.

In various embodiments, the content information comprises at least one of a fluid volume, a solution type, a solute, a solute concentration or a solvent comprising fluid to be contained or contained within a particular syringe. The information may also comprise at least one of a batch number or preparation date of liquid to be contained within a particular syringe.

In various embodiments, the scannable indicia can be disposed at one or more locations on structure including the surface of the support flange, or at least one of the syringes in the plurality. In many embodiments, the indicia are configured to be optically scannable (read), but in other embodiments may also be magnetically or electronically scannable. In additional or alternative embodiments, the indicia may also be manually readable indicia (e.g., readable numbers and/or letters). For optical scannable embodiments, the indicia may comprise one or more of a barcode or a QR code. In some embodiments, the QR code encodes information to a website address which contains or otherwise links to the content information in one or more of the syringes.

In various embodiments, the indicia are positioned or otherwise configured to be scannable/readable by a scanning device associated with the fluid delivery or filling apparatus. In particular embodiments, the indicia are positioned on the structure so as to be easily read by an optical scanning device (e.g., a barcode scanner) positioned at a selected location on the filling or fluid delivery apparatus for example, on the side of either apparatus.

Prior to delving into a more detailed description, it is noted that all publications, patents, and patent applications mentioned in this specification are herein incorporated by reference to the same extent as if each individual publication, patent, or patent application was specifically and individually indicated to be incorporated by reference.

Various embodiments provide apparatus, systems and methods for the filling of multiple syringes with one or more liquid solutions such as nutrient solutions used for cell culture growths within the bioreactor. Many embodiments provide apparatus, systems and methods for the automated filling of multiple syringes where the syringes are integrated into a single structure referred to herein as a syringe pack. In many embodiments, the plurality of syringes are integrated into or otherwise contained in a single structure such as a syringe pack described herein. The apparatus 10 comprises the physical device that performs the filling and the system 110 comprises apparatus 10 loaded with one or more syringes to be filled. In various embodiments, the system may also include external databases or logic resources such as a cloud-based database or a remote computer system operatively coupled to the apparatus.

Referring now to FIGS. 1-8, an embodiment of an automated syringe filling apparatus 10 (herein referred to as an auto-filler 10) for filling a plurality of syringes 20 comprises a housing 30 surrounding all or a portion of the auto-filler, a push-pull mechanism 40, a syringe locking mechanism 50, a manifold engagement fixture 60, a processor or other controller 70, a touch screen or other user interface 80, and electronic port or interface 85 (e.g., a USB port) and an optical or other scanning device 90 for reading indicia 25 (which typically correspond to optical indicia such as a barcode or QR code) on the plurality of syringes encoding information on the contents of one or more syringes 21 in the plurality.

Housing 30 can be fabricated from various rigid and chemically resistant polymers or metals known in the art including, for example. It will also typically include handles 11 to allow for easy transport and positioning of auto-filler 10 for example from a workbench to biosafety cabinet. Handles 11 are desirably recessed to minimize the form factor of the housing 30 and/or minimize interference with tubing and other connections to auto-filler 10. In many embodiments housing 30 also includes four or more feet 12 coupled to a bottom portion of the housing and configured to stabilize and minimize motion of housing during filling action of syringes 20 and also to raise the housing sufficiently (e.g., by 5 to 20 mm) off of a lab work surface to prevent any liquid from seeping into the housing/auto-filler bottom surface. Feet 12 can be fabricated from non-slip high durometer elastomer such as high durometer silicone rubber so as to minimize or prevent motion of the auto-filler during filling operations of multiple syringes 21. In particular embodiments, feet 12 are fabricated, shaped and positioned on housing 30 so as to prevent any rocking or other related motion of the auto-filler when multiple syringes 21 are being filled simultaneously and/or when multiple syringe plungers 22 and the components of push pull mechanism 40 are simultaneously rapidly moving in opposite directions or undergo a rapid change in directions in the course of a syringe filling operation. In many embodiments, housing 30 can also include one or more secondary feet 13 positioned on back angled surface 34 allowing auto-filler 10 to be tipped backwards into stable position in the course of performing one or more operations involved in the syringe filling process such as placement and loading of syringe pack 200 and/or syringes 20 into auto-filler 10.

Push-pull mechanism 40 is typically positioned at least partially within housing 30 and is configured to engage a plurality of syringes 20 and independently advance or retract a plunger 22 of each syringe 21 of plurality 20. In particular embodiments, the push-pull mechanism 40 comprises separate sets 41 of push-pull block assemblies 43, drive screws 46, guide rails 47 and motors 48 with one set for each syringe 21 to be loaded into the mechanism. Each set 41 of the aforementioned components make up a push-pull mechanism subunit 42, with each subunit independently operable from the others. Typically, each subunit 42 has an exterior portion (e.g., the syringe engagement component described below) positioned outside of housing 30 for engaging the syringe 21 and an interior portion (e.g. the block, drive screw and the like) covered by a faceplate 49 attached to housing 30.

The push-pull block assembly 43 comprises a syringe engagement component 44 attached to a block component 45. The syringe engagement component 44 is configured to fit over and engage a syringe plunger head 22h to advance or withdraw the plunger 22. The block 45 is driven by a drive screw 46 which runs through a threaded opening (not shown) in the block component. The bottom portion of the block component 45 also rides over a guide rail 47 (e.g., by means of a slot (not shown) in the bottom portion of the block component) to guide and stabilize the motion of push-pull block assembly 43 as it moves up and down so that the motion of the push-pull block assembly 43 is linear. The motor 48 is mechanically coupled to the drive screw to turn screw. Preferably, the motor 48 corresponds to a stepper motor configured to provide controlled precise movement of the push-pull blocks and thus high precision in filling of syringes 20; however other dc motors known in the electrical arts are also contemplated.

In many embodiments, the push-pull mechanism 40 is configured to simultaneously fill all syringes 21 positioned in the mechanism (either when positioned individually or in the form of a syringe block). Such simultaneous filling allows for rapid filling of all the consumable solutions used for a given bioreactor or other biological run or experiment, saving time by not having to sequentially fill syringes. Simultaneous filling capability will typically be achieved through the separate push-pull mechanism subunits described herein and/or through the use of separate dedicated stepper or other motor for each syringe block. However, in alternative embodiments, simultaneous filling can be implemented through gearing allowing for varying amounts of movement of different push-pull block assemblies 43 even when driven by a single motor 48.

In various embodiments, the push-pull mechanism 40 (herein mechanism 40) can also be configured to have various characteristics to improve the accuracy and precision and other aspects of the syringe filling process. For example, in many embodiments, mechanism 40 is configured to have a well characterized amount of backlash which can cause inaccuracy or variations in fill volumes. A brief explanation will now be provided on backlash. This is a phenomenon caused by inertial deformation or other inertial movement in components of the auto-filler system (e.g., the push-pull block assembly or components of the syringe plungers like the silicone plunger seals) when the push-pull block changes direction for example from advancement to withdrawal. The inertial deformation or movement of one or more of the above components can cause under or over delivery of fluid to a given syringe. Thus, having a well characterized amount of backlash allows for compensatory motions of the syringe plunger to correct for filling inaccuracy caused by the backlash. Examples of such compensatory motions are described below.

Also in many embodiments, mechanism 40 is configured to accommodate syringes 21 of different sizes, for example 50 cc, 100 cc, 200 cc, either singly or when supplied in the form of a single syringe pack 200 described below. In the latter case, the syringes will typically be oriented in the same geometry within the syringe pack, e.g., all horizontal and the like.

Further, mechanism 40 can be configured to fill syringes 21 of syringe plurality 20 (from source containers of selected fluids) over a range of flow rates, e.g., 10, 20. 50, 100, 150 or 200 ml/min or even faster with high accuracy and precision, e.g., accuracy of 95% or greater and precision, as measured by coefficient of variation, of 5% or less. Higher flow rates allow for rapid filling of all syringes and in turn reduced preparation time. Accuracy and precision at higher flow rates are obtained by minimizing and/or compensating for backlash and associated hysteresis in movement of one or more components of the mechanism. Further in specific embodiments, the situation of any backlash or hysteresis in the filling of one syringe affecting filling of another syringe can be minimized through the use of separate and independently operable push-pull mechanism subunits 42. In these and related embodiments, the subunits are configured to minimize the transference of any motion from filling a particular syringe to an adjacent or other subunit.

The syringe locking mechanism 50 also referred to as a syringe nest 50 is mounted or otherwise coupled to the auto-filler housing surface 31 and/or housing 30 and is configured to engage and constrain all syringes 21 (typically five) in the plurality 20 in at three degrees of freedom so as to substantially prevent motion of all syringes in the plurality during the process of filling of one or more syringes in the plurality by the push-pull mechanism 40. In specific embodiments nest 50 is configured to constrain motion or other movement of all the syringes in the plurality in up to six degree of freedom including three degrees of translation motion (e.g., in the x, y and z directions corresponding to forward and back motion, side to side (e.g., left to right) motion and up and down or vertical motion) and up to three degrees of rotational motion (e.g., in the x, y and z directions corresponding to pitch, yaw and roll motions as is known in the aeronautical arts). In embodiments where the plurality of syringes 20 are contained in a syringe pack 200, the syringe nest 50 includes a slot or other opening 51 and a locking element 52 for insertion and engagement of a locking feature 245 on the syringe pack so as to secure the syringe pack in place on/in the syringe nest 50. In specific embodiments, locking element 52 comprises a movable latch 52 that is pivotably coupled to nest 50 such that once locking element 245 is in place in slot 51, latch 52 can be positioned over locking feature 245 to lock it in place in slot 51 (e.g., by an interference fit) using a movable lever arm 53. Lever arm 53 is pivotably coupled to nest 50 and engages latch 52 by means of a protrusions 52p and 53p on the latch 5 and lever arm to move latch down into a locked position over element 245 and also up into an unlocked position to release element 245.

The manifold engagement fixture 60 is mounted to or otherwise coupled to the housing 30 and includes a cam mechanism 61 having a lever arm or other lever means 62. The engagement fixture is configured to detachably engage two mating halves 66 of a multi-port fluid manifold 65 and bring them together to form a fluidic seal between the two halves by movement of lever arm or other lever means 62 (e.g., downward movement). An opposite movement of the lever arm or other lever means 62 is also used to separate the two halves 66 when filling of syringes 20 is complete. Use of cam mechanism 61 and lever arm or other lever means 62 provides the benefit of reducing the risk of contamination of the manifold since the user's hands are kept clear of either half of the manifold to make or break the connection between the two halves. In various embodiments, lever means 62 may correspond to one or more of an arm (including an oval shaped arm), rod or other elongated member. cable, cam, motor or slide.

The multi-port fluid manifold 65 (herein "manifold") serves to make and break a fluid connection between each syringe 21 and a bottle of source fluid (not shown) such as culture media. Specifically, manifold 65 serves to fluidically connect a piece of tubing 68 coming from each syringe to another piece of tubing 69 submerged in the source fluid. In various embodiments, manifold 65 can have up to five or more ports 67 enabling five or more connections to be made instantaneously and sterilely, using the lever operated cam mechanism 61. Various embodiments of the manifold can be configured to provide other benefits as well. For example, the two halves 66 of manifold 66 are typically configured to be asymmetric such that they can only be connected in one arrangement reducing the chance for user error when making the connections between source bottles and syringes 20. Also, the two manifold halves 66 can include labeling, 66*l* (e.g., lettering or numbering) that correspond to similar labeling on syringe pack 200 (or other multi-syringe structure), further reducing the risk of connection error labels on the manifold. The cam mechanism also reduces the force required to make and break fluid connections and thereby reducing user fatigue.

In various embodiments, one or more of manifold engagement fixture 60, cam mechanism 61 and lever arm or other lever means 62 can include additional features to facilitate error free operation of the mechanism and/or auto-filler 10 in general. For example, in certain embodiments cam mechanism 61 and/or lever arm 62 can include a detent (not shown) built into the lever action and configured such that the operator receives tactile feedback when the lever is moved sufficiently to seal the two manifold halves 66 together. Additionally, in certain embodiments, a sensor (not shown) configured to sense the position of lever arm 62 can be positioned on or otherwise operationally coupled to one or more of manifold engagement fixture 60, cam mechanism 61 or lever arm 62. In particular implementations, the sensor can be configured to confirm whether lever arm 62 is in a position where the manifold halves 66 are either in a mated or unmated position. This information or input from the sensor can then be used so the control system will not attempt to move the syringes if the operator has failed to close the manifolds together.

According to one or more embodiments the processor or other controller 70 is disposed within housing 30 and is operatively coupled to at least the push-pull mechanism 40 to control one or more functions or operations of auto filler 10 including motion of the push-pull mechanism. It will also typically be coupled to port or interface 85 to allow for connection to external devices, computer systems and networks (e.g., the internet). Processor 70 typically corresponds to a microprocessor or other logic resources and includes one or more software modules 71 or other electronic instruction sets operable on the processor for controlling one or more functions or operations of auto-filler 10 including operation of the push-pull mechanism for filling the syringes positioned in the mechanism. Collectively, processor 70 and software modules 71 contained or operatively linked to the processor make up a computer system 170. System 170 may also include one or more cloud-based databases or other storage resources 181 in the cloud 180 or remote computers operatively coupled to processor 70 such as a computer 191 comprising or interfaced to web portal 190.

In particular embodiments, the software modules 71 are configured to control motion of individual push-pull block assemblies 43 and thus, the motion of individual syringe plungers 22 for filling a selected syringe 21. Also in many embodiments, processor 70 can be configured to interface with a cloud-based database or other cloud storage resources 181 (e.g., via the internet) that contains filling instructions previously determined by the user through a web browser-based portal 190 such as a personal computer 191 or cellphone 192. The filling instructions can be incorporated into a software module 182 or other electronic instruction set that can be operatively linked to processor 70 through the cloud 180. The portal 190 enables the filling instructions to be generated in a semi-automated manner, checked against the planned delivery for a particular bioreactor run, experiment, and the like, and repeated n times without extra data entry burden on the user. Embodiments where the processor interfaces with a cloud-based database of filling instruction software are sometimes referred to herein as a cloud-based computer system. In these and related embodiments, auto-filler 10 can include memory resources 75 integral to or otherwise operatively coupled to processor 70 for storing software (e.g., software modules 71) containing the filling instructions or other instructions for operation of the push-pull mechanism 40 or other aspect of auto-filler 10.

In addition to controlling location of syringe plungers 22, embodiments of the software modules 71 (stored in processor 70 and/or memory resources 75 or operatively linked to them, e.g., via the cloud or remote network) may include one or more modules 73 configured to perform one or more complex physical movements of the plungers incorporating push and pull actions to do one or more of the following: (1) purge air from the syringes that may have been introduced during the filling process, (2) account for backlash in the mechanical system, (3) ensure maximal precision of the amount filled by ending syringe motion on a "push" to eliminate hysteresis effects of the rubber plunger, and (4) include extra volume in the fill to account for the empty tubing leading into a bioreactor or other vessel which will receive fluid from one or more selected syringes.

There are a number of benefits to performing the above functions. For example, purging air helps ensure the syringe is completely filled with fluid. In addition to reducing total volume error, this can help limit oxidation of air-sensitive components in the culture media or other solution contained in the syringes and reduce evaporation that can lead to crystallization of high concentration components in the solutions such as glucose.

Ending the syringe filling process on a "push" improves fill volume accuracy by eliminating any perceived fluid delivery caused by backlash, as described above, and also eliminating the time-variant hysteresis of flexible components. These components may cause the fluid to begin flowing slightly after the pushing force is applied to the plunger and continue slightly longer after the plunger has stopped. Since this hysteresis can be characterized for each size of syringe, it can be built into the filling process and accounted for, something that would be impossible for a human operator to do by hand.

Extra volume can be included automatically to account for the priming of empty tubing in the bioreactor vessel. This ensures that the volume available to be delivered into the reaction is the exact amount the user specified. If the filling volume is simply "10 mL" for example, the syringe may only be able to deliver "9.5 mL" to the bioreactor, as the "dead volume" remaining between the top of the syringe and the cell culture fluid may be 0.5 mL in this example. This is not something that manual operators would be able to easily account for, but further increases the accuracy of total volume delivery, which is critical in applications where an amount delivered is equally important to the rate at which it was delivered.

In addition to software modules 71 for performing the above motions, in various embodiments, processor 70 can include or be operatively coupled (e.g. via the cloud or a remote network) to modules 71 to control auto-filler 10 including motion of syringe plungers 22 to perform mixing of fluid contained in one or more syringes 21, for example by pumping fluid back and forth between two or more syringes. In particular embodiments, such modules 71 can be configured to use auto-filler 10 to mix a transfection agent solution and a plasmid solution (or other extra-chromosomal DNA solution) contained in two or more syringes to a produce a transfection solution used for cell culture processes involving viral transfection of mammalian or other cells. In these and related embodiments, modules 71 can include specific algorithms for pumping the transfection agent solution and the plasmid solution back and forth between two or more syringes a selected number of cycles (e.g., 3 to 4 times back forth between syringes containing each solution or to a third syringe serving as receptacle of the mixed solutions) and at selected flow rates. The flow rates can correspond to those resulting in shear stress and/or strain rates below that which would cause damage to the DNA (or other genetic material) contained in the plasmid solution. In particular embodiments the flow rates are selected such that fluidic strain rates are below about 1.5× 104 sec$^{-1}$ and more preferably below about 7×103 sec$^{-1}$.

In various embodiments, the final mixed solution may be filled (pumped) into one or more of the syringes containing the precursor solutions (e.g., the transfection agent solution or the plasmid solution) or it may be directed (e.g., under software control) into a receptacle syringe. In alternate or additional embodiments, the act of mixing involves circulating the mixing solution between the syringes containing the precursor solutions and the receptacle syringe.

Touch screen 80 is desirably positioned on a front face 32 of housing 30 and is operably coupled to the processor 70 to send and receive signals to and from the processor. Touch screen 80 is configured for haptic input and display of information associated with operation of the auto-filler, for example, fill volumes for each syringe 21 in plurality 20. It is also configured to send signals to processor 70 encoding the haptic input by a user and receive signals from the processor encoding information to be displayed on the touchscreen. In many embodiments, housing front face 32 includes a navigation button 81 operatively coupled to touch screen 80 to allow a user to navigate to different locations on the touch screen with a gloved or wet finger. Preferably, navigation button 81 is positioned below touch screen 90 on the housing front face so that the user can operate the button without blocking their view of the touch screen. Also, desirably button 81 is positioned low enough on housing 30 (e.g., 1 or 2 inches from the bottom of housing) such as to provide the operator ease of access to the auto-filler 10 while operating the button. In many embodiments, touch screen 80 and navigation button 81 are positioned on the right-side portion of housing face 32 preferably on the bottom right portion of housing face 32 so as to accommodate right-handed users. In alternative embodiments, touch screen 80 and navigation button 81 can be positioned on the left-side portion of housing front face 32 to accommodate left-handed users. Additionally in certain embodiments touch screen 80 can be tilted backward about four degrees or other selected angle relative to vertical axis 15 of auto-filler 10.

Optical scanner 90 is configured to optically scan optical indicia 25 on one or more of the syringes and/or the syringe pack, encoding information on syringe contents (e.g., type and volume of solution) and send signals encoding the information contained in the indicia to the processor. The scanner may correspond to a barcode scanner preferably a 2D scanner and in these and these embodiments, the indicia may correspond to one or more of a barcode 26, QR code 27 or other data matrix 28. However, other optical scanners and indicia known in the art are also contemplated. In particular embodiments, the bar or QR code 26, 27 may encode a website address containing information on the solution type and volume with which a given syringe(s) is to be filled.

Scanner 90 may be embedded or otherwise coupled to various locations on the housing surface 31, but preferably is positioned on a side surface 33 of the housing allowing a user to quickly scan indicia 25 on the syringes 20 and/or a syringe pack 200 without physical or optical interference by components on the front surface of the housing and/or impeding the view of the front surface of the housing.

Through the use of the barcode or other optical scanner 90, consumables used in a bioreactor experiment or run (or other biological run or experiment or IV infusion in the case of medical applications) can be linked in a database to the intended experiment or run. Once linked to a run, the instructions for the consumables (volume, reagent types, and concentrations) can be pulled up for the operator as a reminder. This also completes the traceability cycle, tying together experiment, run, reagents, amount dispensed, and bioreactor vessel, along with consumable information like manufacturing date, sensor calibration data, physical configuration (e.g., syringe capacity, reactor impeller configurations, and the like). By linking all these disparate components together to the fill instructions at the time of syringe filling, the operator gains a high-fidelity record of the experiment to help troubleshoot issues later on and keep a precise history of the parameters and variables that were tested. All of this is done with minimal data entry from the user, and therefore minimizes the risk of mistakes.

Embodiments with Positioned Features on the Auto-Filler Housing Face

In many embodiments, one or more of the push-pull mechanism 40, syringe locking mechanism 50 (also referred to as syringe nest 50), manifold engagement fixture 60 and touch screen 80 including navigation button 81 are at least partially positioned on the front face 32 of auto-filler housing 30. In particular embodiments, all of them are positioned on front face 32 of housing 30. In various embodiments, the aforementioned items can be arranged and positioned with respect to one another so that the positioning and/or use of one item does not physically or visually block another item or otherwise impair its function. For example, manifold engagement fixture 60 is desirably positioned sufficiently above touch screen 80 so that fixture 60 or tubing connections (e.g., tubings 68 and 69) to manifold 65 contained in fixture 60 do not physically or visually block the touch screen or obstruct or impedes its use as well as that of the navigation button 81. Also, the syringe nest 50 and manifold engagement fixture 60 are desirably arranged and positioned on an upper portion of the housing front face 32 so that the lengths of tubings 68 connecting ports 67 on the multi-port manifold 65 to connecting apertures 21a of the plurality of syringes 20 are minimized. In particular embodiments, this can be achieved by positioning the syringe nest 50 and manifold engagement fixture 60 on front face 32 such that a vertical center (depicted by line 54 which is also referred to as a vertical center line 54) of the slot syringe nest 50 substantially vertically aligns with or is otherwise a within maximum distance of a bottom portion 63 of manifold engagement fixture 60. This maximum distance can be within a range of about 0.1 to 1 inches.

Ergonomic Considerations

Figure 6A:
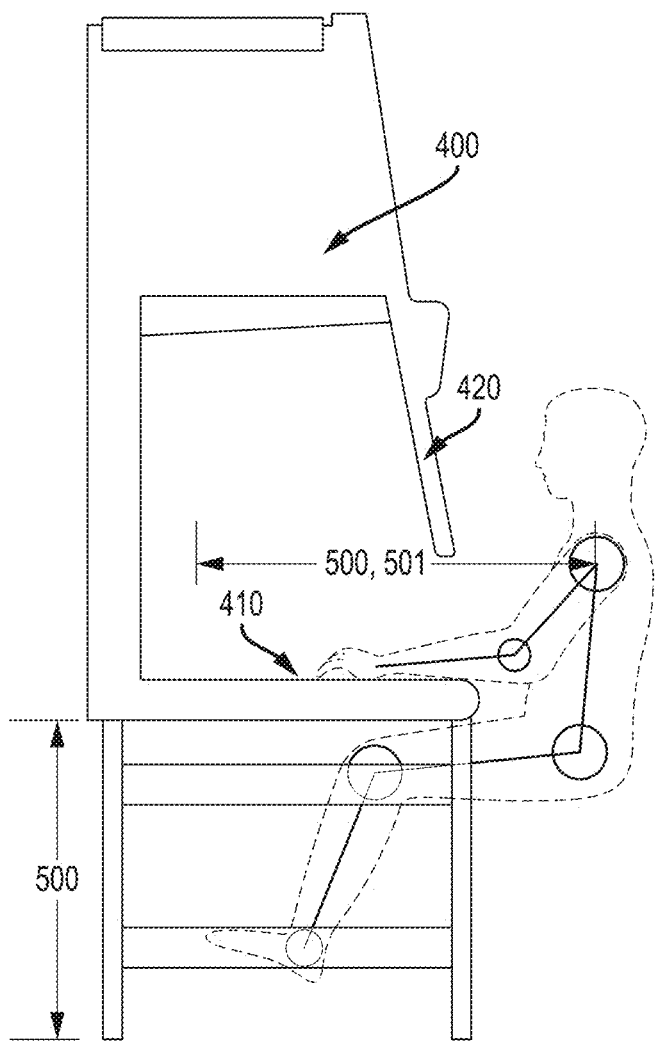
FIG. 6A and FIG. 6B are perspective views illustrating ergonomic considerations for positioning of an embodiment automated syringe filling apparatus on a work surface of a biosafety cabinet behind a window sash of the biosafety hood.
Figure 6B:
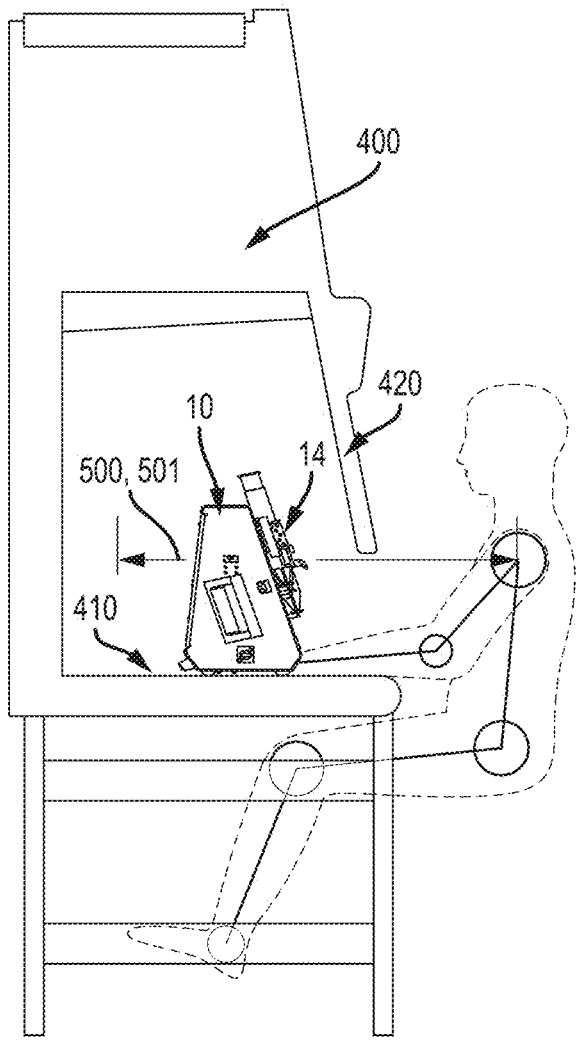
Figure 7:
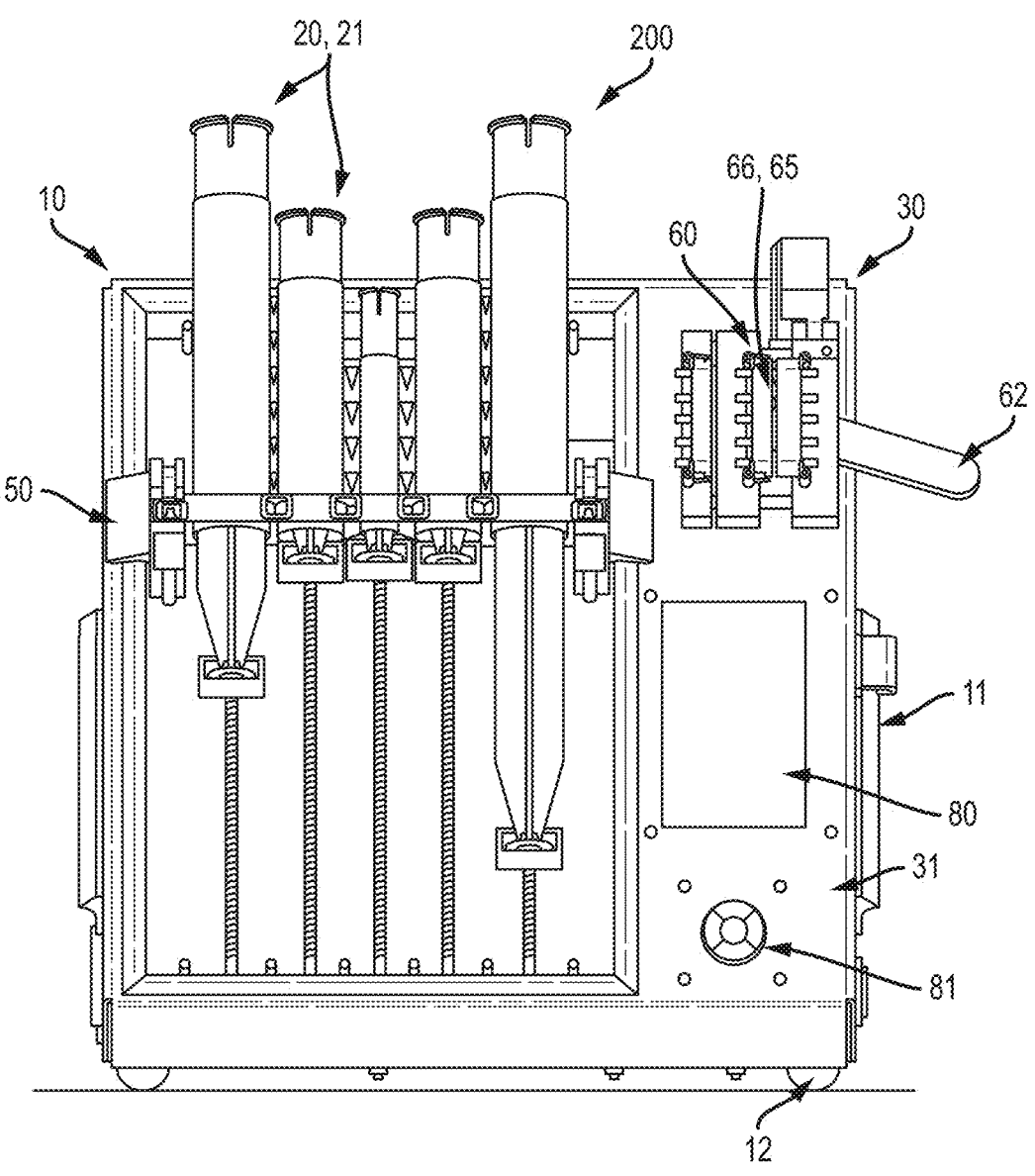
FIG. 7 is a front and side dimensional view of an embodiment of an automated syringe filling apparatus illustrating various dimensional aspects of the apparatus for achieving one or more ergonomic considerations.
Figure 8:
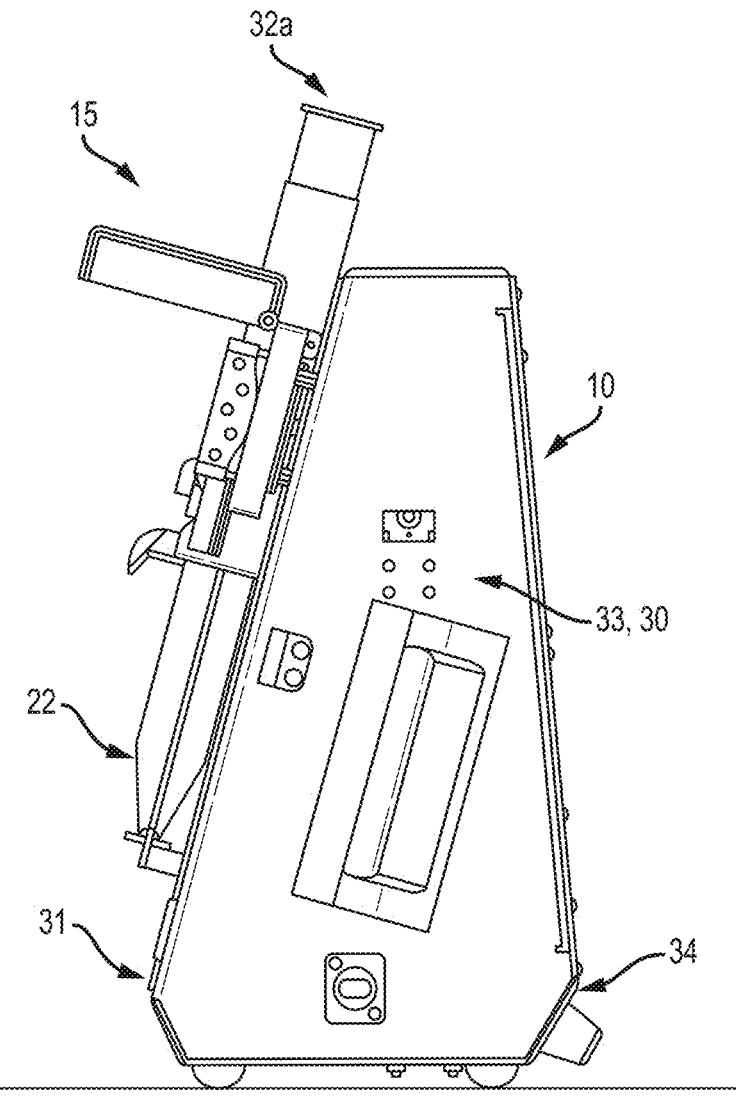
FIG. 8 is a side view of an embodiment of an automated syringe filling apparatus illustrating the tilt angle (away from the user) of the front face of the apparatus housing configured to improve user ergonomics, comfort and screen visibility.

In various embodiments, one or more dimension of auto-filler 10 (e.g., height, width, depth and footprint) can be selected to allow for ergonomic ease of use of the auto-filler taking into account one or more human factor dimensions 500 such as reach forward 501 reach particularly when the auto-filler is positioned on a work surface 410 of a biosafety hood or cabinet 400 (or other biosafety enclosure) behind a window sash 420 of the biosafety cabinet as is depicted in FIG. 6A and FIG. 6B. In particular embodiments, the aforementioned dimensions as well as the position of various components 14 on auto-filler 10 (e.g., the syringe nest 50 and manifold engagement fixture 60) are selected to able to keep user interactions with the auto-filler to a depth of between about 4-16" from the biosafety hood window sash entrance and about 0-16 inches vertically from work surface 410 of the biosafety cabinet. FIG. 7 illustrates various dimensions on the auto filler for achieving these and other ergonomic objectives e.g., visibility of the touch screen or height use of the navigation button while resting the user's hand on a supporting surface.

Embodiments of Auto-Filler Having an Ergonomically Oriented Front Face

In various embodiments, the front face 32 of the housing 30 can be tilted backwards (i.e., away from the user) at an acute angle 32a relative to a vertical axis 15 of auto-filler 10. In particular embodiments, angle 32a is selected to provide for ergonomic operation of the auto-filler by a user when a top or greater portion of the housing is positioned behind the window sash of a biosafety hood (or other biosafety enclosure) and the user has to put their hands and arms up and around the sash to operate the auto-filler including positioning of the syringe pack in and out of the auto-filler and making various tubing connections to syringe pack 200 or other syringe plurality 20. Based on human factors testing and limitations of being able to purge air from a top opening (e.g., a connecting aperture) in the syringes (e.g., the more horizontal the angle of the syringe the harder it is to purge air) as well as visibility of touch screen 80 the optimal angle 32a was found to be approximately 15 degrees. However, in various embodiments, angle 32a can range from 0 to 20 degrees with specific embodiments of 2, 4, 6, 8, 10, 12, 14, 16 and 18 degrees. Also in certain embodiments, display 80 can be tilted back a selected angle (not shown but similar to angle 32a) relative to vertical axis 15. In particular embodiments, front face 32 can have about 0 degrees of tilt (e.g. angle 32a is 0) while display 80 can be tilted back around 4 degrees relative to vertical axis 15

Embodiments for Sterile/Aseptic Syringes Filling

Various embodiments of auto-filler 10 and system 110 are desirably configured to aseptically fill the syringes 21 in the syringe plurality 20/syringe pack 200 with culture media or other selected solution. This objective can be accomplished by several means. First, through the selection of chemically resistant plastic or metal material for auto-filler housing 30 which can wipe down or sprayed with disinfectant solution without appreciable degradation of the housing so that the auto-filler can be brought into a sterile field such as that in biosafety hood without compromising the sterile field. Second, by the configuration of one more of the size, shape, footprint and other attributes of auto-filler 10 so that it can be easily brought into and operated within the confines of a sterile enclosure such as that of a biosafety hood or other biosafety cabinet. This can be further facilitated by the incorporation of handles 11 positioned on either side of auto-filler 10 allowing the user to easily carry and place the auto-filler at a precise location in the biosafety hood. In particular embodiments, handles 11 are at least partially recessed within housing 30 to minimize the form factor of the housing and/or minimize interference with tubing connecting manifold 65, e.g., tubings 68 and 69. In alternative embodiments, handles 11 may also be placed at other locations on auto-filler 10, for example on a top portion of housing 30.

In particular embodiments, aseptic filling of syringes 20 can also be facilitated by configuring the front face of the housing to tilt backwards at an acute angle (e.g. about 15 degrees) relative to a vertical axis of the apparatus allowing the user to ergonomically operate the auto-filler when a portion of the auto-filler is placed behind the window sash of a biosafety cabinet (as discussed above). This will reduce the need of the user to have to push up the window sash to operate the auto-filler including during placement and removal of the syringe pack.

Embodiments of a Syringe Pack and Other Multi-Syringe Structures

Various embodiments provide a syringe-pack or other multi-syringe structure 200 comprising multiple syringes affixed to a common element in the structure or otherwise having an integral structure. Syringe pack 200 is configured to engage with and have its syringes filled by one or more embodiments of the auto-filler 10 described herein. It can also be configured to engage with a multi-unit syringe pump or like fluid delivery apparatus to controllably dispense the liquid contents of each syringe to a bioreactor reactor vessel or other selected vessel or fluid container and in alternative embodiments, to a patient.

Figure 9:
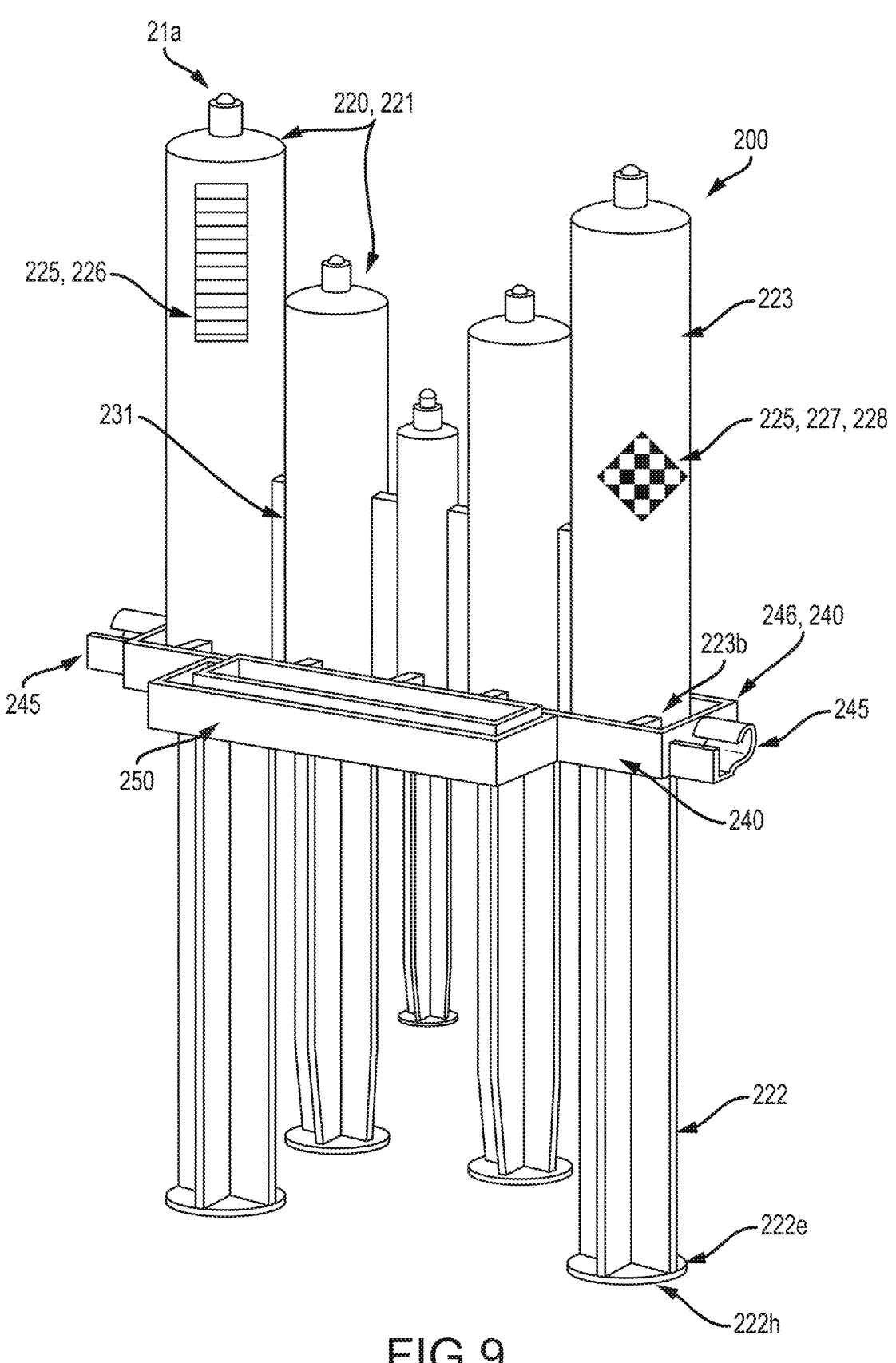
FIG. 9 is an isometric view illustrating an embodiment of a syringe pack comprising multiple syringes integrated into a single structure.
Figure 10A:
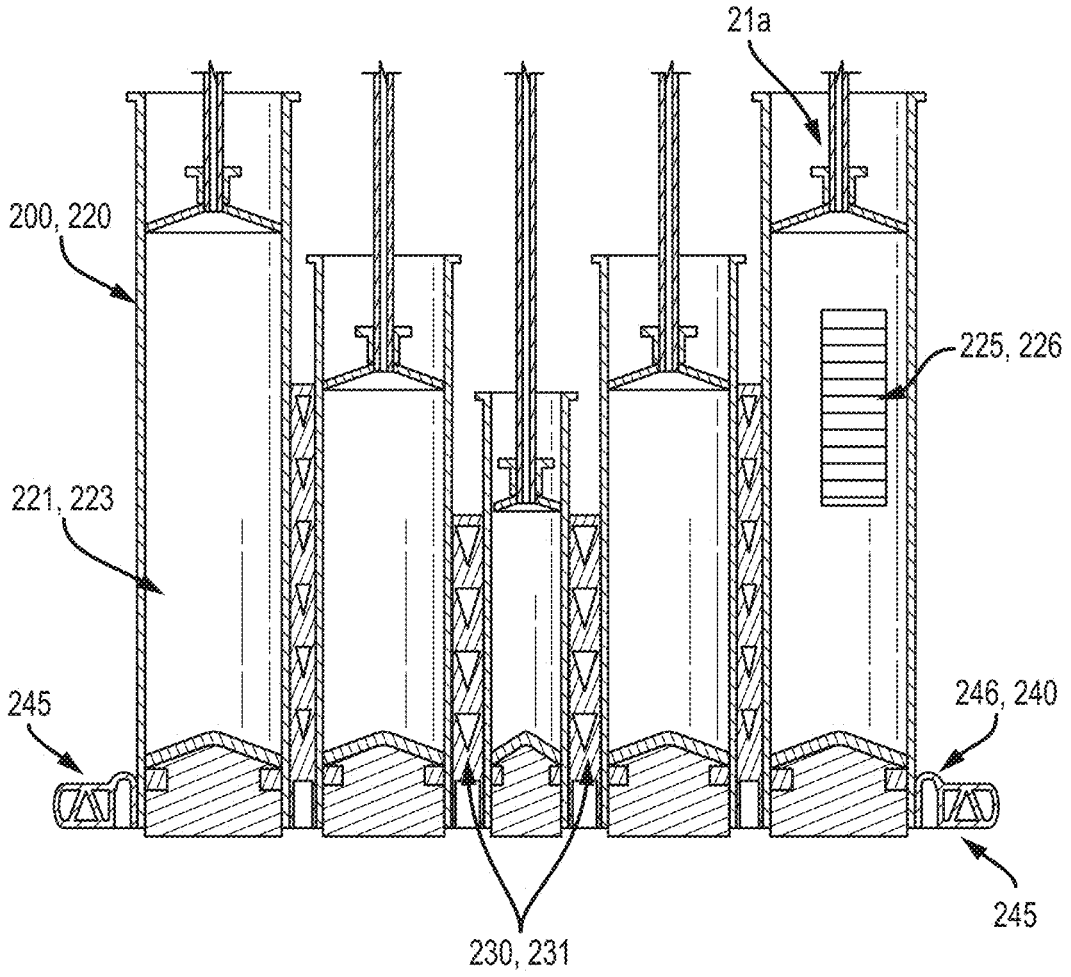
FIG. 10A is a cross-sectional side view of an embodiment of the syringe pack.
Figure 10B:
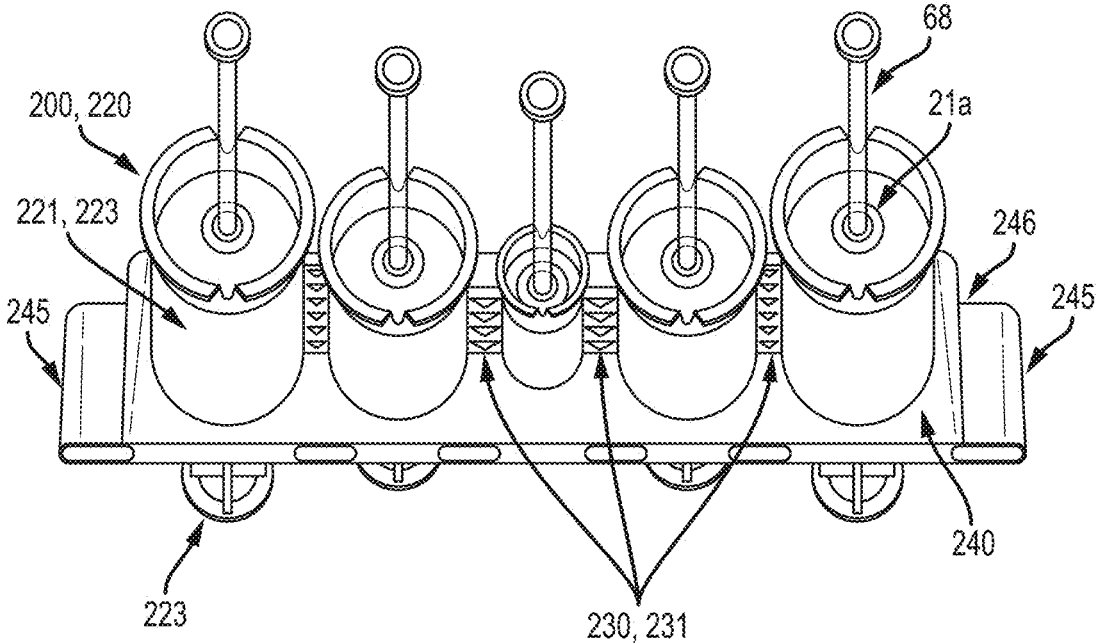
FIG. 10B is a top view illustrating an embodiment of the syringe pack including tubing attachments to syringes in the pack.

Referring now to FIG. 9, FIG. 10A, and FIG. 10B, one embodiment of such a syringe pack or other multi-syringe structure 200 configured for use with at least one of a fluid delivery apparatus or a filling apparatus (e.g., a syringe filling apparatus) comprises a plurality of syringes 220, a plurality of connecting struts 230 and a rigid support flange 240. Each syringe 221 in the plurality includes a syringe body or barrel 223 and a plunger 222 having a plunger head 222h at an exterior end 222e of plunger 222. Each connecting strut 231 of the plurality 230 is fixedly positioned between bodies 223 of two syringes 221 of the plurality 220. The rigid support flange 240 is fixedly coupled to a bottom portion 223b of each syringe body 223 and together with the connecting struts 230 is configured to minimize movement of the syringes 221 in structure 220 with respect to each other. This is achieved by the support flange 240 and connecting struts 230 being positioned and configured to impart structural rigidity to structure 220 to prevent movement of syringes 221. Support flange 240 also includes locking features 245 positioned at opposite horizontal ends 246 of flange 245. The locking features 245 are configured to detachably engage a locking mechanism of the fluid delivery apparatus and when so engaged, the locking features 245 together with the support flange 240 are configured to fix each syringe 221 of plurality 220 in place in three axes so that each syringe head 222h of the plurality of syringes 220 can be independently engaged by separate elements of the fluid delivery apparatus.

Also in many embodiments, the structure includes scannable indicia 225 encoding content information of at least one syringe of the plurality. The content information is used by the filling or fluid delivery apparatus to control the filling or delivery of fluid within at least one syringe of the plurality.

In various embodiments the syringe pack 200 and syringes 220 may be fabricated from various biocompatible polymers known in the syringe arts including for example polyethylene, polypropylene, cyclo-olefin copolymer or cyclo-olefin polymer. Fabrication can of the syringe pack 200 and/or syringe can be performed using various molding methods known in the polymer processing arts including one or more of injection molding and/or rapid injection molding In preferred embodiments, syringe pack 200 (less the syringe plungers 222) is made using a single molding so that the entire syringe pack will have substantially uniform material properties (e.g., elasticity, yield strength and the like, hardness/durometer, and the like). In use, such embodiments provide for more accurate and precise filling and dispensing of fluid from each syringe in the plurality as all the syringe bodies 223 will respond the same way to the application of force and/or fluidic pressure from syringe barrel 222 and/or component of auto-filler 20 such as syringe engagement component 44. In particular embodiments, the support flange 240 comprises a separate molding from the syringe barrels 223 and is configured to allow for different syringe barrels to be introduced into the support flange at the time of use. In use, such embodiments allow for greater flexibility in the selection of syringe materials, solutions and fill volumes.

In some embodiments all syringes 221 in plurality 220 will be of the same size (e.g., diameter and length). In other embodiments, at least two of the syringes 221 in plurality 220 have different barrel sizes and/or different lengths to account for different volumes of liquid to be filled and then dispensed from each syringe. Also in some embodiments, structure 220 includes a handle 250 coupled to support flange 240 which allows the structure to be carried by user without touching the syringes 221 in the structure and thus avoiding potential bio-contamination issues. Handle 250 can also be configured to allow a user to apply a distributed force to the support flange 240 for engaging the locking feature 245 with the locking mechanism of the filling or fluid delivery apparatus.

In various embodiments, the content information encoded in indicia 225 comprises at least one of a fluid volume, a solution type, a solute, a solute concentration or a solvent comprising fluid to be contained or contained within a particular syringe 221. The information may also comprise at least one of a batch number or preparation date of liquid to be contained within a particular syringe. In related or additional embodiments, the information may correspond to an identifier used to link syringe pack 200 to a particular bioreactor vessel, or bioreactor bay that a bioreactor is to be inserted or otherwise placed in.

In various embodiments indicia 225 can be disposed at one or more locations on structure 220 including one more of the surface of the support flange 240, the connecting strut 230 or at least one of the syringes 221 (for example on syringe body 223) in plurality 220. In many embodiments, indicia 225 are configured to be optically readable/scannable, but in other embodiments may also be magnetically or electronically readable/scannable. For optically readable embodiments, indicia 225 may comprise one or more of a barcode 226 or a QR code 227 or other data matrix 228. In some embodiments, the QR code encodes information to a website address which contains or otherwise links to the content information in one or more of syringes 221.

In many embodiments, indicia 225 are positioned or otherwise configured to be readable by a scanning device associated with the fluid delivery or filling apparatus. In particular embodiments, the indicia are positioned on structure 200 so as to be easily scanned and read by an optical scanning device (e.g., a barcode scanner) positioned at a selected location on the filling or fluid delivery apparatus, for example, on the side of either apparatus. In use, such embodiments allow the user to manipulate structure 200 to scan indicia 225 without visually obscuring or physically blocking a front facing portion of either apparatus and/or without interfering with any component on a front facing portion of either apparatus.

In many embodiments, each syringe 221 in the syringe pack 220 include a label 229 such as a letter or number (e.g., A, B, C; 1, 2 3, and the like) or other identifying symbol or marking (e.g., color) which corresponds to the same letter, number, color and the like, on a half of the multiport manifold which is connected or intended to be connected to the syringe pack via tubing connections as is described herein. Typically labels 229 will be positioned on a front surface of support flange 240 but may also be positioned on the body/barrel portion 223 of each syringe 221. This allows a user to quickly check that the right connection is made between each syringe 221 and a bottle or other container 345 of source fluid used to fill each syringe reducing the likelihood of errors.

Embodiment of Auto-Filler Tubing Sets

Figure 11:
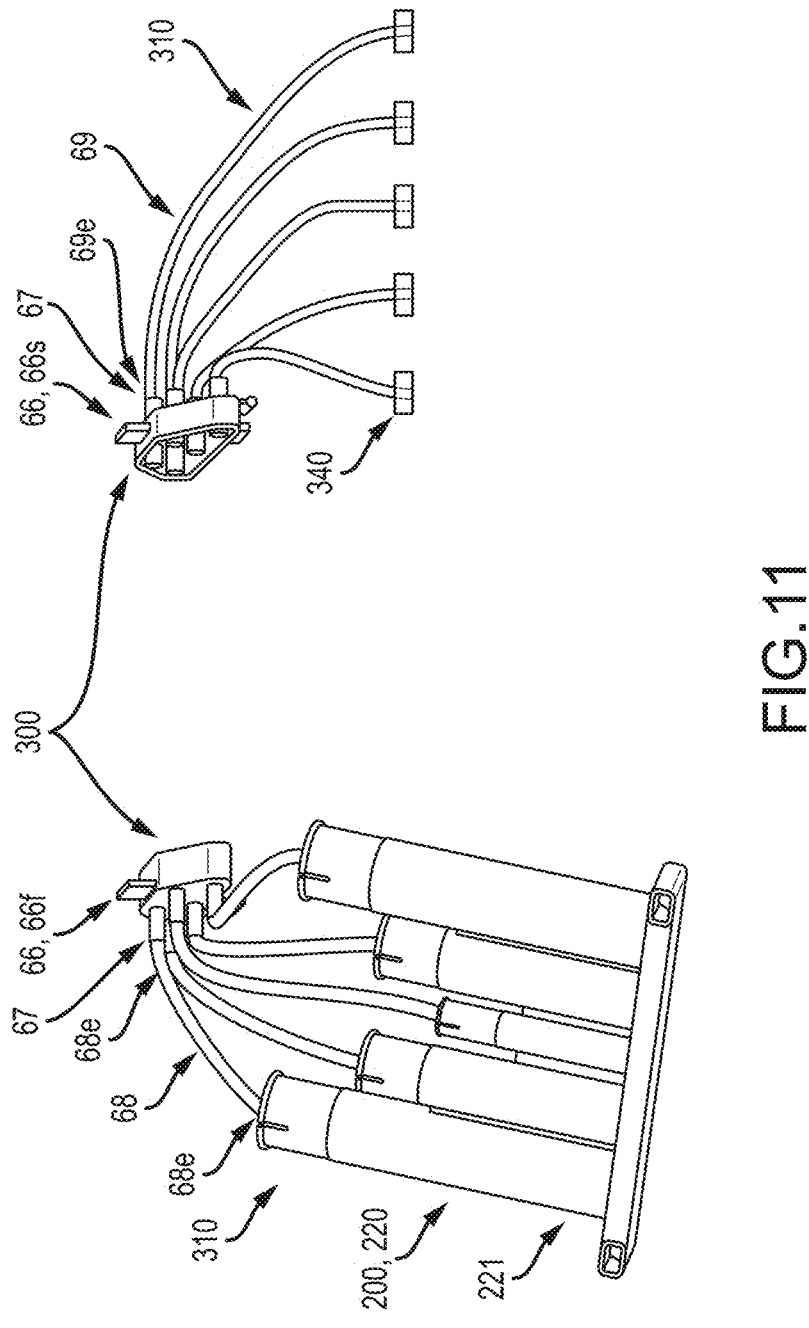
FIG. 11 is a perspective view illustrating an embodiment of a tubing set including the syringe pack connected by tubing to one half of multiport manifold making up one half of the set, and another half of the syringe pack connected by tubing to bottle caps for source fluid bottles making up another half of the set.
Figure 12:
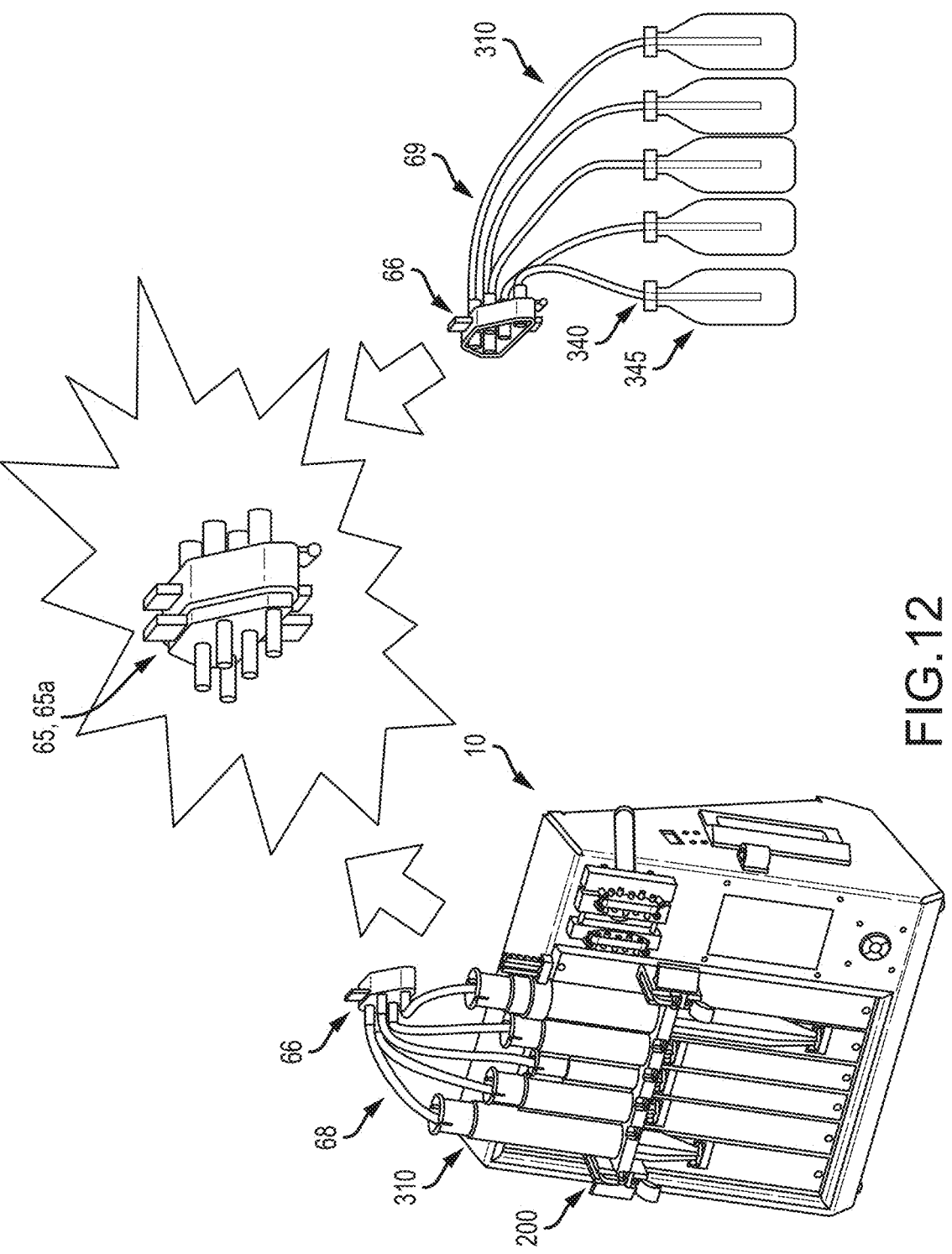
FIG. 12 is a perspective view illustrating the workflow of joining the two halves of the multiport manifold (with the syringe pack and bottle caps each connected to a half of the manifold by tubing) to make a complete tubing set.
Figure 13:
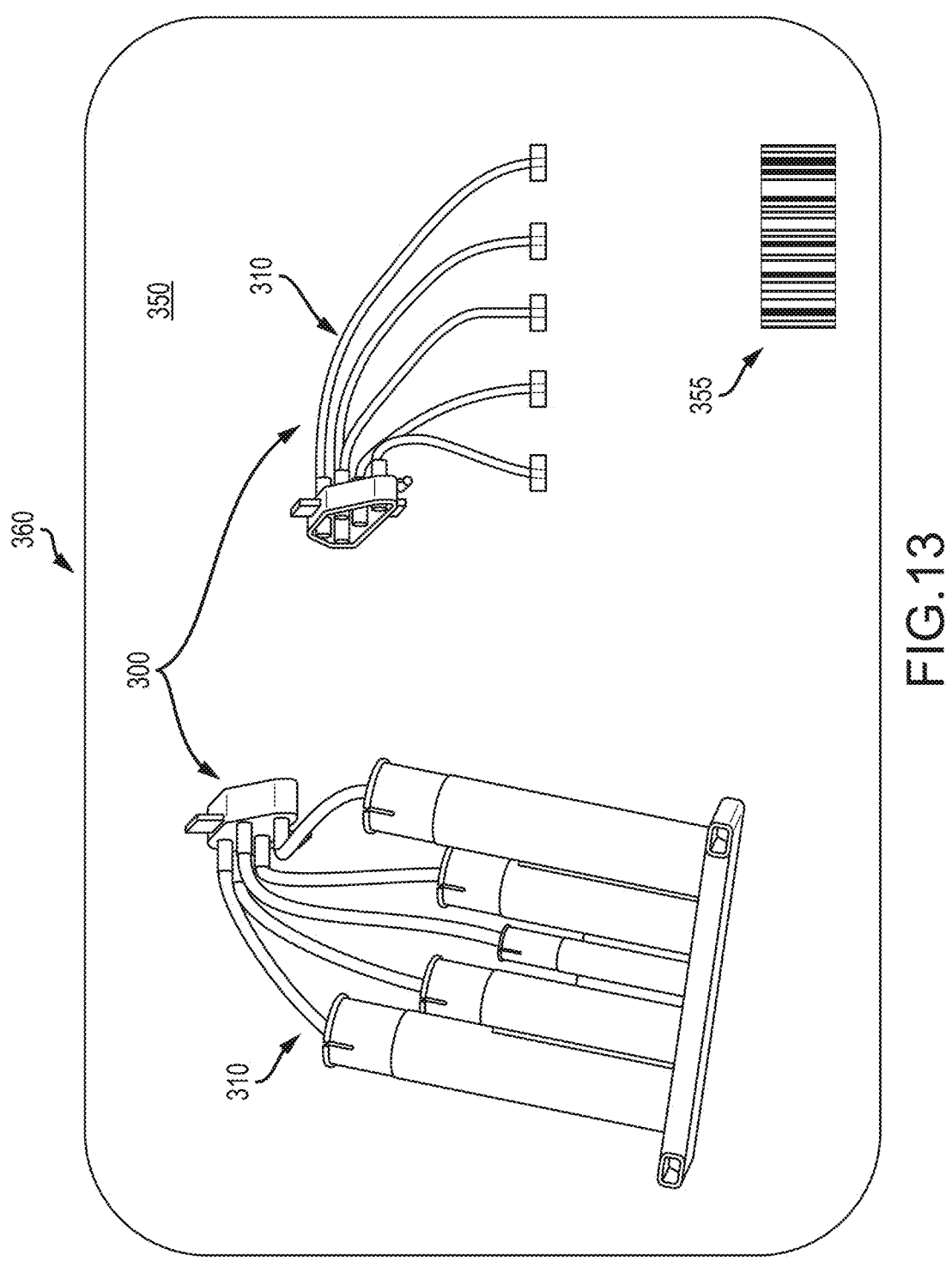
FIG. 13 is a perspective view illustrating an embodiment of a tubing set packed in sterile packing.

Referring now to FIGS. 11-13, various embodiments also provide an auto-filler tubing set 300, herein tubing set 300 comprising syringe pack 200 and half portions 66 of multiport syringe manifold 65 with connecting tubings 68 and 69 between a first manifold half portion 66f and syringe pack 200 and between a second half portion 66s and caps 340 for bottles or other containers 345 of source fluid used to fill syringes 220. In specific embodiments set 300 includes a first portion 310 and second portion 320 where the first portion 310 comprises syringe pack 200 with connecting tubings 68 and first multiport manifold half portion 66f with each tubing 68 connected at one tubing end 68e to each syringe 221 in syringe plurality 220 and at the other end 68e, to a port 67 on multiport manifold half portion 66. Second portion 320 comprises a second multiport syringe manifold half portion 66s and tubings 69 where tubings 69 are connected at one end 69e to a port 67 on half portion 66 and at the other end 69e to a cap 340 for bottle or other container 330 of source fluid 345 used to fill syringes 220. Typically, cap 340 is a screw on cap configured to fit a selected bottle size or type of source fluid.

Tubing set 300 can be provided in one or more forms of packaging including sterile packaging as described below. First and second tubing set portions 310 and 320 may be packaged together in the same packaging 350, while in other embodiments they may be packaged separately. In either case, upon removal from the packaging first and second tubing set halves 310 and 320 can then be fluidically connected by joining first and second multiport manifold halves 66f and 66s (e.g., using cam mechanism 61) to form an assembled multiport fluid manifold 66a as depicted in FIG. 12.

In various embodiments, tubing set 300 may be sterilized (e.g., using gamma irradiation) and packaged in sterile packaging 350 such as TYVEK packaging (or other sterile packaging known in the art) so as to provide a packaged sterile tubing set 360. In such embodiments, tubing set 300 can be fabricated from various polymers known in the medical device arts which can be sterilized by gamma or other radiation modality without degradation in material properties. In some embodiments, first and second tubing set portions 310 and 320 may be packaged together in the same packaging 350, while in other embodiments they may be packaged separately. In one or more embodiments packaging 350 may also include optically scannable indicia 355 such as a barcode or QR code encoding information about set 300 including one or more of lot number, packaging date, customer number and experimental run identifier. In use, sterilely packaged tubing set 360 provides several benefits.

First, it allows for the entire tubing set 300 to be shipped in a sterile condition, eliminating the need to sterilize syringe pack 200 or other components of tubing set 300. Second, it facilitates the sterile filling of syringes 220 in pack 200 by allowing for the removal and assembly of the sterile tubing set 300 and placement of syringe pack 200 into auto-filler 10 all within a sterile field such as that in the biosafety cabinet or hood 400. Third, through use of optical indicia 355 on the outside of the packaging it allows for the aforementioned identifying information on the entire tubing set to be scanned and subsequently uploaded (e.g., to a computer system, cloud database, and the like) in a non-sterile setting before the packaging is opened.

Definitions

The terms "substantially" and "about" are used herein to describe and account for small variations including small variations in a recited, parameter, property, quality, or dimension. For example, when used in conjunction with a numerical value, the terms can refer to a variation in the value of less than or equal to ±10%, such as less than or equal to ±5%, less than or equal to ±4%, less than or equal to ±3%, less than or equal to ±2%, less than or equal to ±1%, less than or equal to ±0.5%, less than or equal to +0.1%, or less than or equal to ±0.05%.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted.

CONCLUSION

While various embodiments have been shown and described herein, it will be obvious to those skilled in the art that such embodiments are provided by way of example only. Numerous variations, changes, and substitutions will be apparent to those skilled in the art without departing from the disclosure. For example, embodiments of the automated syringe filling apparatus and systems described herein can be adapted for use in filling syringes (or other fluid containers) for medical and drug delivery applications, as well for laboratory applications and GMP production applications or any other application requiring high precision sterile filling of syringes or other fluid container. They may also be adapted for various fluidic mixing applications including, for example, mixing of solutions such as transfection agent solutions and plasmid solutions to produce a transfection solution used for cell culture processes involving viral transfection of mammalian or other cells.

Elements, characteristics, or acts from one embodiment can be readily recombined or substituted with one or more elements, characteristics or acts from other embodiments to form numerous additional embodiments within the scope. Moreover, elements that are shown or described as being combined with other elements (e.g., plasmids, cells, viruses, virions, chemical, mechanical component, and the like.), characteristics, steps or acts can, in various embodiments, exist as stand-alone elements, characteristics, steps or acts. Further, various embodiments expressly contemplate the negative recitation of any element, characteristic, step or act and the like, which is/are shown or described in one or more embodiments. Hence, the scope is not limited to the specifics of the described embodiments but is instead limited solely by the appended claim.

All references, including publications, patent applications, and patents, cited herein are hereby incorporated by reference to the same extent as if each reference were individually and specifically indicated to be incorporated by reference and/or were set forth in its entirety herein.

Recitation of ranges of values herein are merely intended to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments, and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

What is claimed is:

1. An apparatus for filling a plurality of syringes, the apparatus comprising:

a housing;

a push-pull mechanism disposed within the housing, the mechanism including a motor and configured to engage the plurality of syringes and independently advance or retract a plunger of each syringe within the plurality;

a syringe locking mechanism coupled to the housing, the locking mechanism configured to engage and constrain all syringes in the plurality in at least three degrees of freedom so as to substantially prevent motion of all syringes in the plurality during a process of filling of one or more syringes in the plurality;

a manifold engagement fixture mounted to the housing, the manifold engagement fixture including a cam mechanism having a lever means, the manifold engagement fixture configured to detachably engage two mating halves of a multi-port fluid manifold and bring them together to form a fluidic seal between the two halves by movement of the lever means;

a processor disposed within the housing and operatively coupled to the push-pull mechanism, the processor configured to control operation of at least the push pull mechanism; and a touch screen coupled to housing and operably coupled to the processor, the touch screen configured for haptic input and display of information associated with operation of the apparatus, the touch screen configured to send signals to the processor encoding the haptic input and receive signals from the processor encoding information to be displayed.

2. The apparatus of claim 1, wherein the apparatus is configured to fill each syringe in the plurality with an accuracy greater than five percent.

3. The apparatus of claim 1, wherein the push-pull mechanism comprises sets of push-pull blocks, linear rails and drive screws and motors, each block assembly coupled to a drive screw which is driven by a separate motor, the block assembly slidably engaging and riding over a rail which guides motion of the pull-block assembly.

4. The apparatus of claim 1, wherein the push-pull mechanism is configured to push and pull on a syringe plunger with a characterized backlash.

5. The apparatus of claim 4, wherein the backlash is less than 5 mm linear travel of the syringe plunger.

6. The apparatus of claim 1, wherein the apparatus is configured to simultaneously fill all syringes in the plurality.

7. The apparatus of claim 1, wherein the apparatus is configured to fill all syringes in the plurality at a rate up to about 200 ml per minute.

8. The apparatus of claim 1, wherein the motor comprises a stepper motor.

9. The apparatus of claim 1, wherein push-pull mechanism is configured to engage syringes of different sizes.

10. The apparatus of claim 1, wherein the plurality of syringes comprises a syringe pack having an integral structure and the locking mechanism is configured to engage the structure.

11. The apparatus of claim 10, wherein the plurality of syringes are oriented in one geometry in the syringe pack.

12. The apparatus of claim 10, wherein the locking mechanism is configured to engage a locking feature on the syringe pack.

13. The apparatus of claim 1, further comprising a scanner coupled to the housing and operatively coupled to the processor, the scanner configured to optically scan indicia on the syringes encoding information on syringe contents and send signals encoding the information contained in the optical indicia to the processor.

14. The apparatus of claim 13, wherein the indicia encodes at least one of a liquid type, a liquid volume, a liquid batch or lot number or a liquid expiration date.

15. The apparatus of claim 13, wherein the indicia comprise a barcode or a QR code.

16. The apparatus of claim 14, wherein the QR code encodes information to a website address.

17. The apparatus of claim 16, wherein the website contains or links to the content information.

18. The apparatus of claim 1, wherein the apparatus is configured to aseptically fill the plurality of syringes.

19. The apparatus of claim 1, wherein the housing comprises a material that can be sterilized or disinfected with a disinfectant solution without appreciable degradation of the housing.

20. The apparatus of claim 19, wherein housing comprises metal or plastic.

21. The apparatus of claim 19, wherein the apparatus is configured to be disinfected sufficiently to be brought into a sterile field for sterile filling of the syringes.

22. The apparatus of claim 1, further comprising a navigation button operatively coupled to the touch screen, the navigation button configured to allow a user to navigate between locations on the touch screen using a gloved finger.

23. The apparatus of claim 1, wherein a multi-port fluid manifold contains at least five ports.

24. The apparatus of claim 1, wherein the apparatus is configured to apply push pull actions on the plurality of syringes to perform additional functions to filling of the syringes.

25. The apparatus of claim 24, wherein the additional functions comprise at least one of purging air from the syringes, accounting for backlash in operation of the push-push mechanism, ending a filling step of a selected syringe with a push on the syringe barrel and/or including extra volume in a fill of a selected syringe to account for empty tubing leading from that syringe.

26. The apparatus of claim 24, wherein the processor includes at least one software module for controlling the push-pull mechanism to perform the additional functions.

27. The apparatus of claim 1, wherein at least one of the apparatus or the processor is configured to be operatively coupled to a database containing previously determined electronic instructions for filling the plurality of syringes.

28. The apparatus of claim 27, further comprising memory resources for storing the electronic instructions, the memory resources operatively coupled to the processor.

29. The apparatus of claim 28, wherein the processor includes the memory resources.

30. The apparatus of claim 28, wherein the database is hosted in at least one of an on-premises server, a virtual server, or the cloud.

31. The apparatus of claim 1, wherein at least one of the push-pull mechanism, syringe locking mechanism, manifold engagement fixture or touch screen are at least partially positioned on a front face of the housing.

32. The apparatus of claim 31, wherein the manifold engagement fixture is positioned above the touch screen on the front face of the housing such that the fixture or tubing connections there do not physically or visually block the touch screen or obstruct use of the touch screen.

33. The apparatus of claim 31, wherein the manifold engagement fixture is positioned on the front face of the housing to allow tubing connections to be made between ports on one half of a mated manifold positioned in the fixture and end portions of the plurality of syringes when the syringes are in a locked position in the syringe locking mechanism.

34. The apparatus of claim 33, wherein the syringe locking mechanism and the manifold engagement mechanism are arranged and positioned on an upper portion of the front face of the housing such that tubing lengths connecting ports on the multi-port manifold to tips of the plurality of syringes are minimized.

35. The apparatus of claim 34, wherein a vertical center line of the syringe locking mechanism is within about 2 inches of a vertical center line of the manifold engagement fixture.

36. The apparatus of claim 31, wherein the front face of the housing is titled backwards at an acute angle relative to vertical, the angle selected for ergonomic operation of the apparatus by a user when at least a portion of the apparatus is positioned behind a window sash or other safety shield of a biosafety cabinet.

37. The apparatus of claim 36, wherein the angle is in a range from about 10 to 20 degrees.

38. The apparatus of claim 36, wherein the ergonomic operation includes positioning and locking of the plurality of syringes in the locking mechanism.

39. The apparatus of claim 1, wherein the apparatus includes at least one of a battery power supply, a chargeable battery power supply, or a lithium-ion power supply.

40. The apparatus of claim 1, where the lever means comprises a lever arm, rod, slide, cam or motor.

41. The multi-syringe structure of claim 40, wherein at least two of the syringes in the plurality have different sizes.

42. The apparatus of claim 1, wherein the at least three degrees of freedom include translational degrees of freedom in the x, y and z directions.

43. The apparatus of claim 1, wherein the at least three degrees of freedom include rotational degrees of freedom in the x, y and z directions.

44. The multi-syringe structure of claim 43, wherein at least two of the syringe plungers in the plurality of syringes have different lengths.

45. The apparatus of claim 1, wherein the at least three degrees of freedom comprise translational degrees of freedom and rotational degrees of freedom.

46. The apparatus of claim 45, wherein the translational degrees of freedom are in at least one of the x, y and z directions.

47. The apparatus of claim 45, wherein the rotational degrees of freedom are in at least one of the x, y and z directions.

48. The apparatus of claim 1, wherein the apparatus is configured to mix the contents of at least one syringe of the plurality of syringes with the contents of at least one other syringe of the plurality of syringes.

49. The apparatus of claim 48, wherein the mixing is configured to mix at least one plasmid solution with at least one transfection agent solution to produce a transfection solution used for viral transfection of cells.

50. The apparatus of claim 49, wherein the processor includes a module for controlling the mixing of the one plasmid solution with at least one transfection agent solution.

51. An apparatus for filling a plurality of syringes, the apparatus comprising:

a housing;

a push-pull mechanism disposed within the housing, the mechanism including a motor and configured to engage the plurality of syringes and independently advance or retract a plunger of each syringe within the plurality;

a syringe locking mechanism coupled to the housing, the locking mechanism configured to engage and constrain all syringes in the plurality in six degrees of freedom so as to substantially prevent motion of all syringes in the plurality during a process of filling of one or more syringes in the plurality;

a manifold engagement fixture mounted to the housing, the manifold engagement fixture including a cam mechanism having a lever means, the manifold engagement fixture configured to detachably engage two mating halves of a multi-port fluid manifold and bring them together to form a fluidic seal between the two halves by movement of the lever means;

a processor disposed within the housing and operatively coupled to the push-pull mechanism, the processor configured to control operation of at least the push pull mechanism; and a touch screen coupled to housing and operably coupled to the processor, the touch screen configured for haptic input and display of information associated with operation of the apparatus, the touch screen configured to send signals to the processor encoding the haptic input and receive signals from the processor encoding information to be displayed.

52. The apparatus of claim 51, wherein the six degrees of freedom include three degrees of translational freedom in the x, y and z directions and three degrees of rotational freedom in the x, y and z directions.

53. An apparatus for filling a plurality of syringes contained in a syringe pack, the apparatus comprising:

a housing;

a push-pull mechanism disposed within the housing, the mechanism including a motor and configured to engage the plurality of syringes and independently advance or retract a plunger of each syringe within the plurality;

a syringe locking mechanism coupled to the housing, the locking mechanism configured to engage the syringe pack and constrain all syringes in the plurality in at least three degrees of freedom so as to substantially prevent motion of all syringes in the plurality when during a process of filling of one or more syringes in the plurality;

a manifold engagement fixture mounted to the housing, the engagement fixture including a cam mechanism having a lever means, the engagement fixture configured to detachably engage two mating halves of a multi-port fluid manifold and bring them together to form a fluidic seal between the two halves by movement of the lever means;

a processor disposed within the housing and operatively coupled to the push-pull mechanism, the processor configured to control operation of at least the push pull mechanism; and a touch screen coupled to housing and operably coupled to the processor, the touch screen configured for haptic input and display of information associated with operation of the apparatus, the touch screen configured to send signals to the processor encoding the haptic input and receive signals from the processor encoding information to be displayed.

54. A multi-syringe structure for delivery of multiple fluids, the structure adapted for use with at least one of a fluid delivery apparatus or a filling apparatus, the structure comprising:

a plurality of syringes, each syringe comprising a syringe body and a plunger having a plunger head;

a plurality of rigid connecting struts, each connecting strut fixedly positioned between the bodies of two syringes in the plurality; and a rigid support flange fixedly coupled to a bottom portion of each syringe body, the support flange having locking features positioned at horizontal ends of the flange, the locking features configured to detachably engage a locking mechanism of the fluid delivery apparatus and when so engaged, the support flange and the locking features configured to fix each syringe of the plurality in place in three axes so that each syringe head of the plurality of syringes can be independently engaged by separate elements of the fluid delivery apparatus; and wherein the multi-syringe structure includes indicia encoding content information of at least one syringe of the plurality.

55. The multi-syringe structure of claim 54, wherein the content information is used by the filling apparatus to control the filling of fluid within at least one syringe of the plurality.

56. The multi-syringe structure of claim 54, wherein the content information is used by the delivery apparatus to control the delivery of fluid within at least one syringe of the plurality to at least one of a chamber, vessel or bioreactor vessel.

57. The multi-syringe structure of claim 54, wherein at least two of the syringes in the plurality have different sizes.

58. The multi-syringe structure of claim 54, wherein at least two of the syringe plungers in the plurality of syringes have different lengths.

59. The multi-syringe structure of claim 54, wherein at least two of the syringe bodies in the plurality of syringes have different diameters.

60. The multi-syringe structure of claim 54, further comprising a handle coupled to the support flange, the handle configured to allow carrying of the structure without touching of syringes in the plurality.

61. The multi-syringe structure of claim 54, wherein the handle is configured to allow a user to apply a distributed force to the support flange for engaging the locking feature with the locking mechanism of the fluid delivery apparatus.

62. The multi-syringe structure of claim 54, where the content information comprises at least one of a fluid volume, a solution type, a solute, a solute concentration or a solvent comprising fluid to be contained or contained within a particular syringe.

63. The multi-syringe structure of claim 54, where the content information comprises at least one of a batch number or preparation date of liquid to be contained within a particular syringe.

64. The multi-syringe structure of claim 54, wherein the indicia are disposed on surface of the support flange or at least one of the syringes in the plurality.

65. The multi-syringe structure of claim 54, wherein the indicia are configured to be optically, magnetically or electronically readable.

66. The multi-syringe structure of claim 65, wherein the indicia comprise a barcode or a QR code.

67. The multi-syringe structure of claim 66, wherein the QR code encodes information to a website address.

68. The multi-syringe structure of claim 67, wherein the website contains or links to the content information.

69. The multi-syringe structure of claim 54, wherein the indicia are configured to be readable by a scanning device associated with the fluid delivery or filling apparatus.

70. The multi-syringe structure of claim 69, wherein the scanning device is an optical scanning device.

71. The multi-syringe structure of claim 54, wherein at least one syringe of the plurality of syringes is preloaded with a selected fluid.

72. The multi-syringe structure of claim 71, wherein all syringes of the plurality are preloaded with a selected fluid.

73. The multi-syringe structure of claim 54, wherein the structure comprises at least one of a polymer, polyethylene, polypropylene, cyclo-olefin copolymer or cyclo-olefin polymer.

74. A multi-syringe structure for delivery of multiple fluids to a reaction vessel to create a customized fluid mixture within the vessel, the structure adapted for use with a delivery apparatus, the structure comprising:

a plurality of syringes, each syringe comprising a syringe body and a plunger having a plunger head;

a plurality of rigid connecting struts, each connecting strut fixedly positioned between the bodies of two syringes in the plurality; and a rigid support flange fixedly coupled a bottom portion of each syringe body, the support flange having locking features positioned at horizontal ends of the flange, the locking features configured to detachably engage a locking mechanism of the fluid delivery apparatus and when so engaged, the support flange and the locking features configured to fix each syringe of the plurality in place so that each syringe head of the plurality of syringes can be independently engaged by separate elements of the fluid delivery apparatus without having to realign the structure between fluid deliveries from different syringes in the plurality; and wherein the multi-syringe structure includes indicia encoding content information of each syringe of the plurality of syringes, the content information used by the delivery apparatus to control the delivery of fluid within at least one syringe of the plurality to the reaction vessel.

\* \* \* \* \*